United States Patent
Cormican

(10) Patent No.: US 12,267,533 B2
(45) Date of Patent: *Apr. 1, 2025

(54) DYNAMIC CUSTOM INTERSTITIAL TRANSITION VIDEOS FOR VIDEO STREAMING SERVICES

(71) Applicant: Google LLC, Mountain View, CA (US)

(72) Inventor: Neil Cormican, Menlo Park, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/862,319

(22) Filed: Jul. 11, 2022

(65) Prior Publication Data

US 2022/0345761 A1 Oct. 27, 2022

Related U.S. Application Data

(63) Continuation of application No. 16/908,616, filed on Jun. 22, 2020, now Pat. No. 11,388,452, which is a
(Continued)

(51) Int. Cl.
*H04N 21/234* (2011.01)
*H04N 21/25* (2011.01)
(Continued)

(52) U.S. Cl.
CPC ..... *H04N 21/23424* (2013.01); *H04N 21/251* (2013.01); *H04N 21/25891* (2013.01);
(Continued)

(58) Field of Classification Search
CPC ......... H04N 21/23424; H04N 21/4316; H04N 21/4302; H04N 21/26258; H04N 21/845
See application file for complete search history.

(56) References Cited

U.S. PATENT DOCUMENTS 9,557,896 B1 1/2017 Toff et al.
2005/0005308 A1* 1/2005 Logan ................ H04N 21/4782
348/E7.071
(Continued)

FOREIGN PATENT DOCUMENTS

CN 1798594 A 7/2006
CN 1805540 A 7/2006
(Continued)

OTHER PUBLICATIONS

Unknown. "How Can I Prevent the Next Episode of a Show from Playing Automatically?". Netflix. https://help.netflix.com/en/node/2102. retrieved Jun. 22, 2017. 3 pages.
(Continued)

*Primary Examiner* — Yassin Alata
(74) *Attorney, Agent, or Firm* — Lowenstein Sandler LLP

(57) ABSTRACT

A method to provide a custom interstitial transition video includes identify a base media item comprising a display area to be customized for a user of a client device to provide a transition between a first video to be played on the client device and a plurality of second videos playable on the client device after the first video, causing the first video to be played on a screen of the client device, causing the display area of the base media item to be automatically customized to transform the base media item into a custom transition media item that presents information about each of the plurality of second videos playable after the first video, and causing the base media item with the customized display area to be presented on the screen of the client device before playing any of the plurality of second videos, wherein the customized display area is overlaid with metadata content items of the plurality of media content items each comprising information about the respective one of the plurality of second videos.

20 Claims, 16 Drawing Sheets

Related U.S. Application Data continuation of application No. 15/629,618, filed on Jun. 21, 2017, now Pat. No. 10,694,223.

(51) Int. Cl.

| | | |
|---|---|---|
| *H04N 21/258* | (2011.01) | |
| *H04N 21/262* | (2011.01) | |
| *H04N 21/2668* | (2011.01) | |
| *H04N 21/43* | (2011.01) | |
| *H04N 21/431* | (2011.01) | |
| *H04N 21/458* | (2011.01) | |
| *H04N 21/462* | (2011.01) | |
| *H04N 21/47* | (2011.01) | |
| *H04N 21/81* | (2011.01) | |
| *H04N 21/845* | (2011.01) | |
| *H04N 21/8547* | (2011.01) | |
| *H04N 21/45* | (2011.01) | |
| *H04N 21/482* | (2011.01) | |

(52) U.S. Cl.
CPC ... *H04N 21/26258* (2013.01); *H04N 21/2668* (2013.01); *H04N 21/4302* (2013.01); *H04N 21/43074* (2020.08); *H04N 21/4312* (2013.01); *H04N 21/4316* (2013.01); *H04N 21/458* (2013.01); *H04N 21/4622* (2013.01); *H04N 21/47* (2013.01); *H04N 21/8146* (2013.01); *H04N 21/845* (2013.01); *H04N 21/8547* (2013.01); *H04N 21/4532* (2013.01); *H04N 21/482* (2013.01)

(56) References Cited

U.S. PATENT DOCUMENTS

| | | | |
|---|---|---|---|
| 2005/0022245 A1 | 1/2005 | Nallur et al. | |
| 2008/0002949 A1 | 1/2008 | Tokunaka et al. | |
| 2008/0319833 A1* | 12/2008 | Svendsen | H04L 69/00 707/999.005 |
| 2009/0193464 A1* | 7/2009 | Friedlander | H04N 21/6125 725/41 |
| 2009/0288112 A1* | 11/2009 | Kandekar | H04N 21/4532 725/32 |
| 2010/0094866 A1* | 4/2010 | Cuttner | H04N 21/44224 707/723 |
| 2010/0199295 A1 | 8/2010 | Katpelly et al. | |
| 2014/0325568 A1 | 10/2014 | Hoang et al. | |
| 2015/0143413 A1* | 5/2015 | Hall | G10L 13/08 725/34 |
| 2015/0373385 A1* | 12/2015 | Straub | H04N 21/23424 725/34 |
| 2016/0127793 A1 | 5/2016 | Grouf et al. | |
| 2016/0212455 A1 | 7/2016 | Manna | |
| 2016/0291824 A1 | 10/2016 | Grossman et al. | |
| 2016/0381437 A1 | 12/2016 | Kitch et al. | |
| 2017/0168697 A1 | 6/2017 | Shpalter et al. | |

FOREIGN PATENT DOCUMENTS

| | | |
|---|---|---|
| CN | 101124536 A | 2/2008 |
| CN | 101371308 A | 2/2009 |
| CN | 101821760 A | 9/2010 |
| CN | 102172036 A | 8/2011 |
| CN | 102647626 A | 8/2012 |
| CN | 103024480 A | 4/2013 |
| CN | 103380627 A | 10/2013 |
| CN | 103501449 A | 1/2014 |
| CN | 103533439 A | 1/2014 |
| CN | 103647988 A | 3/2014 |
| CN | 103748531 A | 4/2014 |
| CN | 104137553 A | 11/2014 |
| CN | 105765990 A | 7/2016 |
| CN | 106210860 A | 12/2016 |
| EP | 2076027 A1 | 7/2009 |
| EP | 2076027 B1 | 5/2013 |
| JP | 2007079800 A | 3/2007 |
| JP | 2009159367 A | 7/2009 |
| WO | 2016066760 A1 | 5/2016 |

OTHER PUBLICATIONS

Unknown. "Auto-generated Topic Channels". https://support.google.com/youtube/answer/2579942?hl=en. Retrieved Jun. 22, 2017. 3 pages.

Ken Yeung. "YouTube is Testing a new Auto-generated Playlist Feature called YouTube Mix to aid in Video Discovery." Apr. 22, 2013. Google. https://thenextweb.com/google/2013/04/22/youtube-experimenting-on-new-video-discovery-feature-called-youtube-mix/#.tnw_aM9a7Lpl. retreived Jun. 22, 2017. 5 pages.

Sittler, D. Li A. "New Ways to Watch Facebook Video". Facebook. http://newsroom.fb.com/news/2017/02/new-ways-to-watch-facebook-video/_ Feb. 14, 2017, retrieved Jun. 22, 2017. 4 pages.

Unknown. "Basic Guide to EE TV". http://ee.eo.uk/help/mobile-and-home-connections/broadband-gallery-mobile-broadband/ee-tv-help/basic-guide-to-ee-tv. retrieved Jun. 22, 2017. 3 pages.

International Search Report and Written Opinion mailed by the International Searching Authority for application No. PCT/US2018/025532 mailed on Jun. 8, 2018, 16 pages.

European Patent Application No. 18719374.3 Office Action dated Oct. 12, 2020, 12 pages.

India Patent Application No. 201947043791 Office Action dated Feb. 8, 2021, 7 pages.

Japan Patent Application No. 2019-559281 Office Action dated Feb. 22, 2021, 13pages.

China Patent Application No. 201880028904.1 Office Action dated May 8, 2021, 20 pages.

China Patent Application No. 202210520145.9 Notice of Allowance dated Dec. 5, 2022, 6 pages.

Japan Patent Application No. 2021-190163 Notice of Allowance dated Jan. 16, 2023, 6 pages. (Best available copy).

Shao, Dawei, "Deepening Content and Expanding Channels: Reflections on Strengthening the Guide Function of CCTV's TV Guide," News Frontier, Feb. 17, 2022, 17 pages.

\* cited by examiner

DYNAMIC CUSTOM INTERSTITIAL TRANSITION VIDEOS FOR VIDEO STREAMING SERVICES

RELATED APPLICATIONS

This application is a continuation application of co-pending U.S. patent application Ser. No. 16/908,616, filed Jun. 22, 2020, which is a continuation application of U.S. patent application Ser. No. 15/629,618, filed Jun. 21, 2017, now U.S. Pat. No. 10,694,223, each of which is herein incorporated by reference.

TECHNICAL FIELD

Aspects and implementations of the present disclosure relate to video streaming, and more specifically, to dynamic custom interstitial transition videos for video streaming services.

BACKGROUND

Video streaming services provide videos to users over the Internet. Typical video streaming services abruptly stop a video when the video has ended, and abruptly start the next video. Some services do not start the next video unless a user initiates the video to play. Some conventional video streaming services display static information for the next video that is to be played. In traditional television (TV) broadcasting systems, when a TV program ends, some traditional television networks broadcast a commercial-type segment to inform the viewer of an upcoming program.

SUMMARY

Aspects of the present disclosure improve media transition technology by dynamically creating and presenting an interstitial transition video in real-time. Interstitial transition videos are transition videos that can be played in between videos. The videos can be in a playlist or can be videos that have been scheduled to be played. The interstitial videos can include information of the upcoming videos. The interstitial transition videos are created and presented by a user device (e.g., personal computer, smart phone, tablet, etc.), rather than on a server or a headend broadcasting system.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Figure 1:
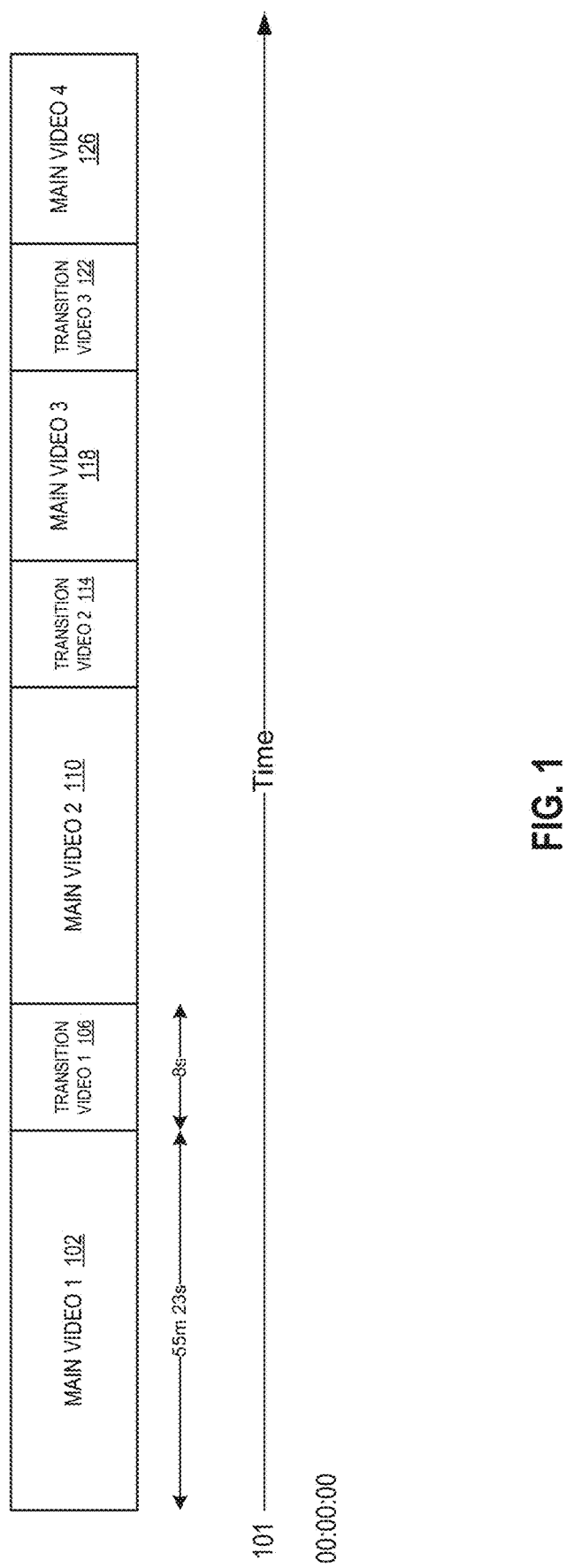
FIG. 1 depicts an example timeline of videos being streamed, in accordance with one implementation of the present disclosure.

Aspects and implementations of the present disclosure are directed to dynamic custom interstitial transition videos for video streaming services. An interstitial transition video refers to a video that is played between two videos. In one implementation, interstitial transition videos include information about the video(s) that are to be played next. In one implementation, this information about the video(s) is animated. Interstitial transition videos can be played in between videos in a playlist or in between videos that have been scheduled to be played. A video streaming service can be an on demand online source for videos, TV shows, movies and other streaming media. With traditional video streaming services, when videos finish, the videos are abruptly stopped. For example, when a video ends, a static image is immediately displayed, and there is time delay up to a few seconds (e.g., 8 seconds) until the next video begins to play. During the time delay, the title of the next video and a countdown of the time delay (e.g., 8 seconds) can be displayed with the still image. Traditional video streaming services provide static images or advertisements in between videos and do not provide transition videos that inform users of upcoming videos.

In traditional television (TV) broadcasting systems, when a TV program ends, a commercial-type segment is broadcasted as a transition to inform the viewer of an upcoming program. The segment can include the TV network logo and the title of the next TV program. The segment is generally created by a broadcast headend system and then displayed by a device (e.g., television). The content of the segment is the same for all viewers. Generally, the broadcast headend system does not create custom segments for individual viewers.

Aspects of the present disclosure improve media transition technology by dynamically creating a custom interstitial transition video for a user in real-time on a device (e.g., user device). As used herein, the term real-time is used to indicate events that occur proximate in time to their cause, e.g., without unnecessary delay. For example, real-time creation of an interstitial transition video involves collecting, during playback of a current video, data for a next video, and displaying, by a user device, the data for the next video immediately (e.g., within a predefined time limit, such as 0.1 second or less than 0.1 second) after the current video has finished playing.

Accordingly, described herein in various implementations are technologies that provide increased flexibility in creating transition segments by providing interstitial transition videos in real-time on a user device. Implementations of the present disclosure can change the information that is being presented in an interstitial transition video in real-time. The videos that are to be played next may be selected for a particular user, and implementations of the present disclosure can customize the information that is being presented in an interstitial transition video for the particular user.

FIG. 1 depicts an example timeline of videos being streamed, in accordance with one implementation of the present disclosure. Streaming media is video or audio content sent over the Internet and played immediately, rather than being saved to a hard drive. With streaming media, a user does not have to wait to download a video file to play the video. A device can play a streaming video in real-time as the data for the video arrives at the device. Real-time streaming of a video involves displaying portions of a video as soon as the corresponding portions of the video stream are received.

Axis 101 represents time. A video streaming service can stream various types of videos, such as, a main piece of video content (referred to here as main video(s)) and an interstitial piece of content (referred to here as an interstitial transition video or transition video). Examples of main videos can include videos from content providers of a content sharing platform, videos from network television providers, videos from video streaming service providers. Main Video 1 102, Main Video 2 110, Main Video 3 118, and Main Video 4 126 are examples of main videos. The main videos can be individual streams of video.

The selection of which main videos are to be streamed and played can be based on a pre-defined schedule and/or can be dynamically determined. In one implementation, the main videos can be dynamically selected in real-time for a particular user. As used herein, real-time selection or real-time determination of one or more videos to be played next refers to determining a main video has finished playing, and making a selection or determination, in real-time (e.g., within a predefined time limit, such as 0.1 second or 0.5 second, of the main video finishing), of the video(s) to be played next based on an analysis of a set of videos that are associated with a user (e.g., played by a user, liked by a user, shared by a user, etc.). In one implementation, the selection of which main videos are to be streamed and played is based on videos that a user has watched, liked, shared, added to a playlist, commented on, subscribed to (as part of a channel subscription or individually), etc.

For example, a user may be watching Main Video 1 102, which is a video about snowboarding in Utah. A recommendation system may select, in real-time, Main Video 2 110, which may be a video about snowboarding in Colorado, as the next main video to be streamed and played. As part of the selection, the recommendation system may also select, in real-time, Main Video 3 118, which may be a video about snowboarding in Canada, as the main video to be played after the next video.

Transition videos can be played in between main videos to provide information about the main videos that are to be streamed and played next. Transition Video 1 106, Transition Video 2 114, and Transition Video 3 122 are examples of transition videos. The transition videos can be individual streams of video. In one implementation, a transition video provides information for the next main video that is to be streamed and played next. In another implementation, a transition video provides information for the next two main videos that are to be streamed and played next. For example, when played, Transition Video 1 106 may have a duration of 8 seconds and can display an animation of information (e.g., title "Snowboarding in Utah") about upcoming Main Video 2 110 and information (e.g., title "Snowboarding in Colorado") for upcoming Main Video 3 118.

Figure 2:
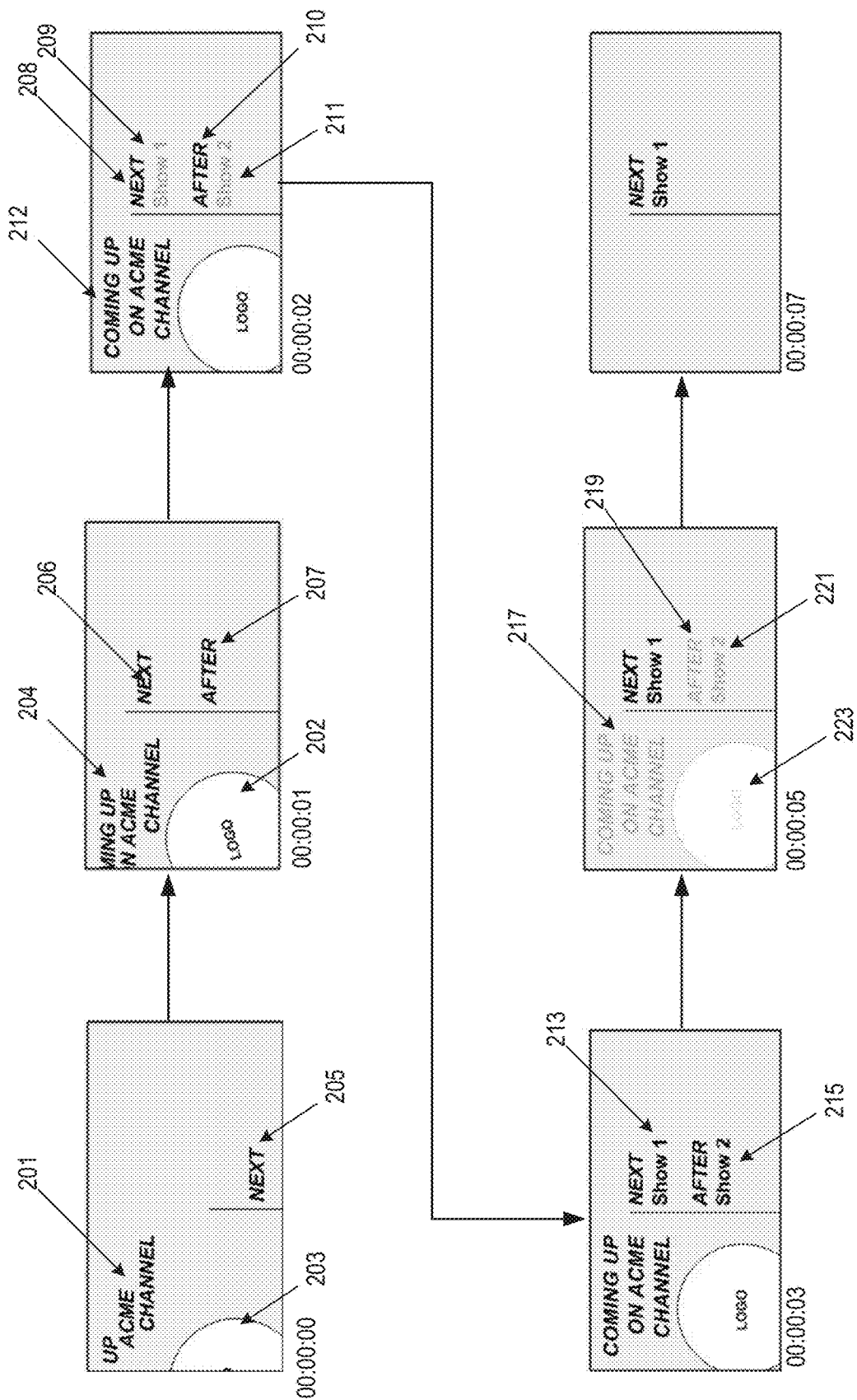
FIG. 2 depicts an example time series of frames of a presentation of an interstitial transition video, in accordance with one implementation of the present disclosure.

FIG. 2 depicts an example time series of frames of a presentation of an interstitial transition video, in accordance with one implementation of the present disclosure. The transition video can be, for example, Transition Video 1 106 in FIG. 1. Transition Video 1 106 can have a duration of 8 seconds and can be played after Main Video 1 102 and before Main Video 2 110. The time series begins at timestamp 00:00:00 until timestamp 00:00:07.

At timestamp 00:00:00, when a main video (e.g., Main Video 1 102 in FIG. 1) has finished playing, the transition video begins to play. The transition video can include elements, such as, text, graphics, and one or more channel identifiers. A channel can be data content available from a common source or data content having a common topic or theme. The data content can be digital content chosen by a user, digital content made available by a user, digital content uploaded by a user, digital content chosen by a content provider, digital content chosen by a broadcaster, etc. The channel identifiers can include text and/or image(s). For example, the channel identifier can be text 201 "ACME CHANNEL" and image 203. Image 203 can be a logo for the ACME channel. In one implementation, the transition video is not associated with a channel and does not include any channel identifier. For example, the transition video may include text "COMING UP" rather than text "COMING UP ON ACME CHANNEL."

The elements in the transition video can be animated. The elements can have animated features, such as fading in and out, bouncing in, spinning in, floating in and out, etc. For example, at timestamp 00:00:00, the text "UP," "ACME," and "CHANNEL" may individually float in from the left side into view. In another example, image 203 may spin into view, and header text 205 "Next" may start to float in from the bottom into view.

At timestamp 00:00:01, more text 204 may individually float in, image 202 continues to spin into view, header text "Next" continues to float in until reaching position 206 and header text 207 "After" floats in from the bottom until reaching a specified position.

At timestamp 00:00:02, additional text 212 floats into view, the title text "Show 1" 209 fades into view positioned below the header text 208 "Next", and the title text "Show 2" 211 also fades into view positioned below the header text 210 "After." The header texts 208,210 indicate the type of information that is to appear nearby (e.g., below, above) the respective header text. For example, the header text 208

"Next" indicates that information (e.g., title "Show 1") that appears below the header text 208 is for a video that is to be played next. Header text 210 "After" indicates that information (e.g., title "Show 2") that appears below the header text 210 is for a video that is to be played after the next video. At timestamp 00:00:02, title text "Show 1" 209 and title text "Show 2" 211 may be configured to have a particular transparency value (e.g., 75%) for the fade in animation.

At timestamp 00:00:03, title text "Show 1" 213 and title text "Show 2" 215 may be fully faded in and may not have any transparency. At timestamp 00:00:05, text "COMING UP ON ACME CHANNEL" 217, image 223, header text "AFTER" 219, and title text "Show 2" 221 may be fading out of view and may each be configured to have a particular transparency value (e.g., 80%). At timestamp 00:00:07, text "COMING UP ON ACME CHANNEL" 217, image 223, header text "AFTER" 219, and title text "Show 2" 221 have fully faded out of view. When the transition video ends, for example, at timestamp 00:00:08, the next video titled "Show 1" begins to play.

Figure 3:
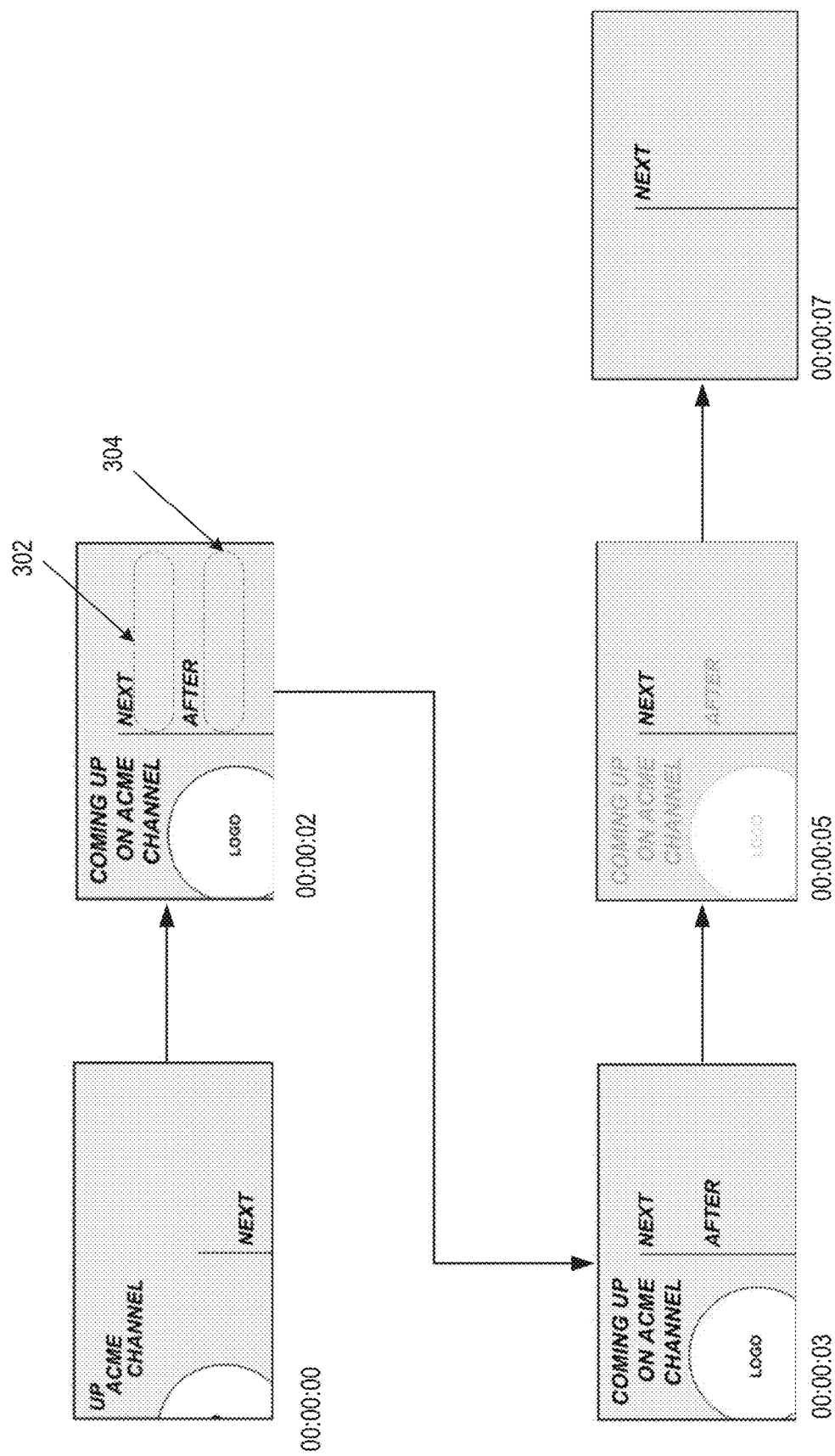
FIG. 3 depicts an example time series of frames of playing a base video component of an interstitial transition video, in accordance with one implementation of the present disclosure.

The transition video is a composite of a pre-defined base video component and a dynamic metadata overlay component. FIG. 3 depicts an example time series of frames of playing a base video component of an interstitial transition video, in accordance with one implementation of the present disclosure. The base video component (hereinafter referred to as "base video") does not include information for the actual main videos that are to be played next. The base video is a pre-defined video that includes an area 302, in the frames of the base video, which is reserved for an overlay of metadata describing a main video that has been dynamically selected to be played next. The base video can include one or more other areas (e.g., area 304), in the frames of the base video, that are reserved for an overlay of metadata describing another main video that has been dynamically selected to be played after the next main video. In one implementation, the base video is for a particular channel and can be provided by a channel owner. A creator of a base video can designate one or more areas in the frames of the base video to be reserved for an overlay of metadata.

Figure 4:
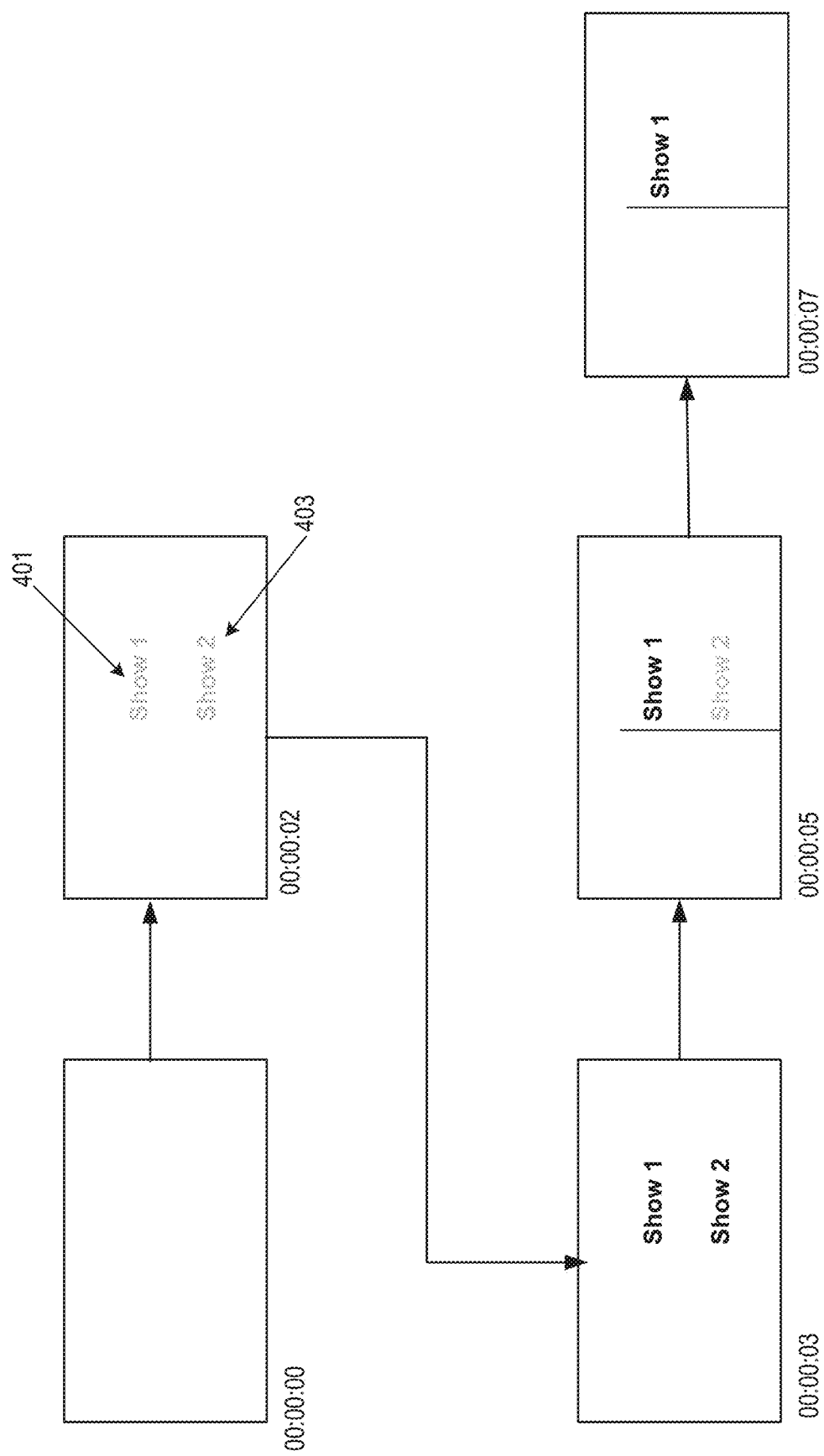
FIG. 4 depicts an example time series of frames of a dynamic metadata overlay component of a transition video, in accordance with one implementation of the present disclosure.

FIG. 4 depicts an example time series of frames of a dynamic metadata overlay component of a transition video, in accordance with one implementation of the present disclosure. When the main videos are selected dynamically, for example, for a particular user, the information (e.g., title of video, channel of video, creator of video, statistics of video) to be presented in the transition video is also determined dynamically in real-time and presented, by a client device, as part of the dynamic metadata overlay component.

The dynamic metadata overlay component (hereinafter referred to as "metadata overlay") refers to a presentation of metadata. The presentation can be animated. The metadata can be for one or more main videos that have been dynamically selected to be played. The metadata can include, for example, a title of the video, a creator of the video, a channel of the video, one or more keywords associated with the video, and statistics for the video. Examples of the statistics can include a number of views, a number of likes, a number of dislikes, a number of shares, a number of playlists including the video, and a number of comments. The metadata overlay can be a presentation of metadata on a layer, which has portions that are transparent or semi-transparent layer, on a display. The metadata overlay can be a foreground layer presented on a display and the playing of the base video can be a background layer on the display.

The metadata overlay can be created from an executable presentation template. The executable presentation template can include executable code or an executable script that includes fields and/or placeholders that are assigned to particular metadata. For example, the presentation template can include a text field for the title of the video and another text field for a channel that is associated with the video. The fields and/or placeholders in the presentation template can be populated in real-time with the corresponding metadata, as described in greater detail below in conjunction with FIG. 5. The presentation template, which when populated and executed, presents one or more animations of metadata on a display as illustrated in the time series of frames. For example, a text field for the title of the next video to be played may be populated with the metadata "Show 1," and a text field for the title of the video that is to be played after the next video may be populated with the metadata "Show 2." At timestamp 00:00:02 an animation of the metadata 401 "Show 1" and an animation of the metadata 403 "Show 2" fade into view.

Figure 5:
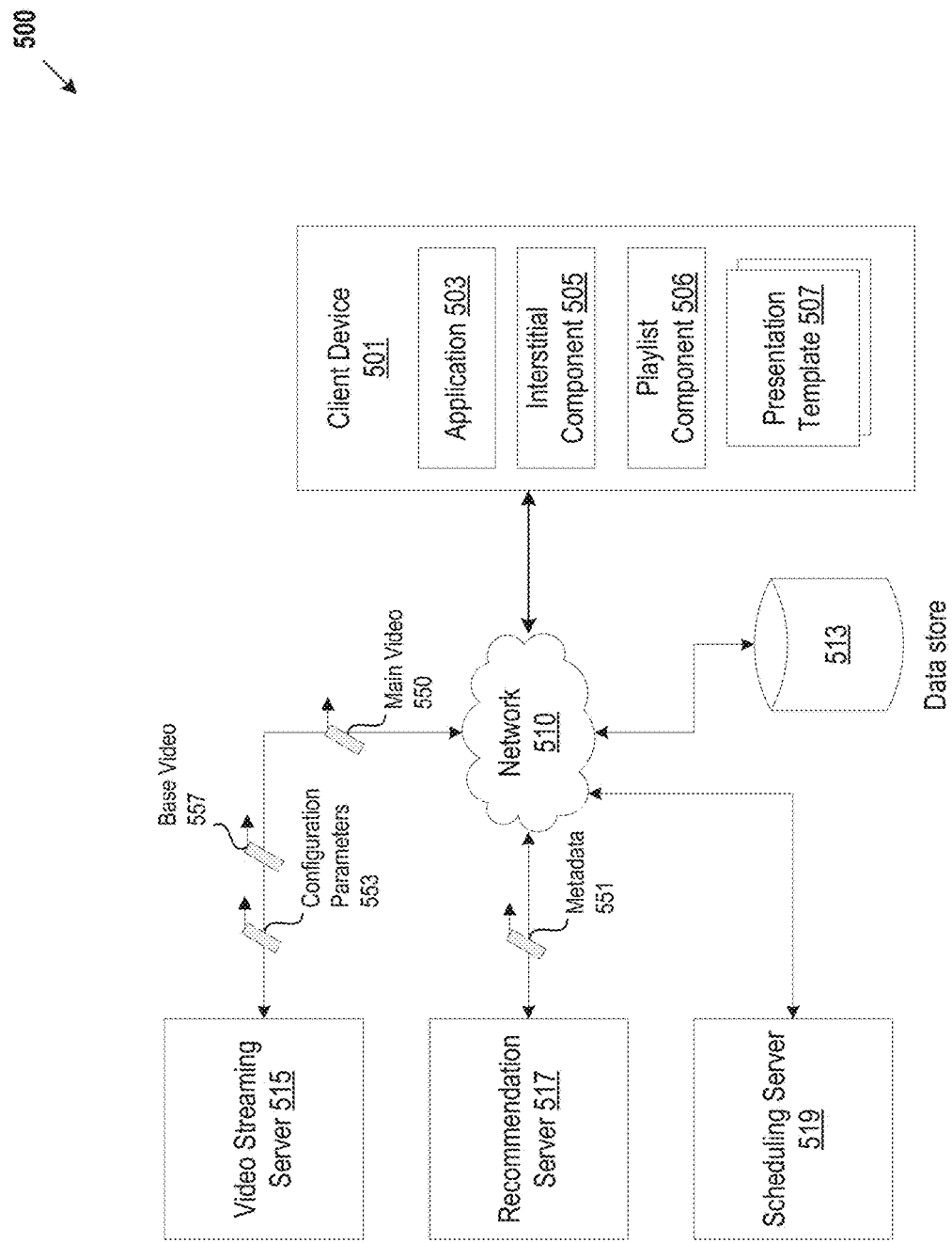
FIG. 5 illustrates exemplary system architecture for implementations of the present disclosure.

FIG. 5 illustrates exemplary system architecture 500 for implementations of the present disclosure. The system architecture 500 can include one or more client devices 501, one or more servers 515,517,519 and one or more data stores 513 coupled to each other over one or more networks 510. The network 510 may be public networks (e.g., the Internet), private networks (e.g., a local area network (LAN) or wide area network (WAN)), or a combination thereof. The servers 515,517,519 can be hosted on machines, such as, and not limited to, rackmount servers, personal computers, desktop computers, media centers, or any combination of the above.

The data stores 513 can store media items, such as, main videos for streaming and playback. The media items can include, and are not limited to, digital video, digital movies, digital photos, digital music, website content, social media updates, electronic books (ebooks), electronic magazines, digital newspapers, digital audio books, electronic journals, web blogs, real simple syndication (RSS) feeds, electronic comic books, software applications, etc. A data store 513 can be a persistent storage that is capable of storing data. As will be appreciated by those skilled in the art, in some implementations data store 513 might be a network-attached file server, while in other implementations data store 513 might be some other type of persistent storage such as an object-oriented database, a relational database, and so forth.

The video streaming server 515 can provide a video streaming service to one or more client devices 501. The video streaming server 515 can stream videos (e.g., main videos, base videos) to the client devices 501. In one implementation, the video streaming server 515 is part of a content sharing platform, such as content sharing platform 1120 described in greater detail below in conjunction with FIG. 11. In one implementation, the video streaming server 515 is part of a content provider platform, such as content provider platform 1195 described in greater detail below in conjunction with FIG. 11.

The client devices 501 can include an application 503 for playing media items (e.g., videos). The application 503 may be, for example, a web browser that can access content served by the video streaming server 515. In another example, the application 503 may be an application (e.g., mobile application, smart TV application) that can access content served by the video streaming server 515. The client devices 501 can be computing devices such as personal computers (PCs), laptops, mobile phones, smart phones, tablet computers, netbook computers, network-connected televisions, etc.

In one implementation, the video streaming server 515 streams the videos according to a pre-defined schedule. In one implementation, the scheduling server 519 creates a schedule of videos to be streamed and stores the schedule in a data store 513, which can be accessed by the video streaming server 515.

In one implementation, the video streaming server 515 streams the videos according to a dynamic selection of videos made by a recommendation server 517. The recommendation server 517 can select, in real-time, one or more videos to play next in the video streaming service provided by the video streaming server 515. In one implementation, the recommendation server 517 is part of a recommendation platform, such as recommendation platform 1157 described in greater detail below in conjunction with FIG. 11.

The client device 501 can receive a video stream of a main video 550 from the video streaming server 515, and the application 503 on the client device 501 can play the main video 550 on a display that is coupled to the client device 501. In one implementation, the client device 501 can receive a universe resource identifier (URI) (e.g., universe resource locator (URL)) for the main video 550 from the video streaming server 515, and the client device 501 can use the URI to obtain the main video 550 via an Internet connection over network 510. The client device 501 receives portions of the main video 550 stream and plays the portions as they are received.

When the playing of the main video has finished, the client device 501 can immediately play a transition video as a notification of the one or more upcoming videos to be played. The transition video is a composite of a pre-defined base video component (e.g., base video 557) and a dynamic metadata overlay component (e.g., executable presentation template). The playing of a transition video can include the playing of the base video in a background layer on a display and executing a presentation template to present metadata items in a foreground layer on the display. A main video may finish, for example, if the video has reached its end, if a user forwards to the end of the video, or if a user skips playback of the video.

The client device 501 can include an interstitial component 505 to dynamically create and play custom transition videos. The interstitial component 505 can communicate with or be a part of the application 503.

The interstitial component 505 can receive a base video 557 and configuration parameters 553 for the base video 557 from the video streaming server 515. The base video 557 and configuration parameters 553 can be stored in a data store 513, which the interstitial component 505 can access. In one implementation, the interstitial component 505 receives a base video identifier (e.g., URI) from the video streaming server 515 and uses the URI to obtain the base video 557 via an Internet connection over network 510. The configuration parameters 553 specify how and when to display metadata items when executing a particular presentation template 507 that corresponds to the base video 557. The configuration parameters 553 can include a set of time codes, font styles, font sizes, font colors, positions and types of animations for fields and/or placeholders in the presentation template 507 and/or the metadata items that are populating the fields and/or placeholders. In one implementation, each time code has one or more corresponding metadata identifiers indicating which metadata item(s) are to be displayed at the respective time code, a corresponding font style, a corresponding font color, a corresponding position, and a corresponding animation type to be used to display the specified metadata item(s) at the respective time code.

The dynamic metadata overlay component can be created by populating an executable presentation template 507, which corresponds to the base video 557, with metadata 551 for the videos that have been selected to be played next, and executing the populated presentation template. The interstitial component 505 can select an executable presentation template 507 to use to create a transition video. The selection of an executable presentation template 507 is described in greater detail below in conjunction with FIG. 7. The client device 501 can locally store one or more executable presentation templates 507 or can access one or more executable presentation templates 507 stored in the data store 513. The executable presentation templates 507 can be provided by the video streaming server 515 and/or content providers (e.g., channel owners).

The recommendation server 517 can provide the metadata 551 for the videos that have been selected to be played next. The data stores 513 can store metadata 551 for the media items (e.g., videos). The metadata 551 can include, for example, a title of a media item, a creator of a media item, a channel of a media item, one or more keywords associated with a media item, and statistics for a media item. Examples of the statistics can include a number of views, a number of likes, a number of dislikes, a number of shares, a number of playlists including the media item, and a number of comments made for a media item.

The metadata overlay corresponds to one or more particular base videos, and the presentation of the metadata overlay is synchronized with the playing of the corresponding base video, as described in greater detail below in conjunction with FIGS. 6A-6E.

The client device 501 can include a playlist component 506 to dynamically create a custom filler playlist of videos for the particular user to fill a period of time (e.g., 7 minutes) until a next video is played. The playlist component 506 is described in greater detail below in conjunction with FIGS. 8-10.

A transition video is a composite of the playing of a base video 557 and the execution of an executable presentation template 507 populated with metadata items from metadata 551. The execution of the presentation template can result in animations presenting metadata items in a foreground layer on a display and the playing of the base video can be in a background layer on the display. FIGS. 6A-6E depict an example time series of frames of the playing of the base video 557 in a background layer on a display and laying an animated metadata presentation in a foreground layer on the display to dynamically create a custom transition video for a user, in accordance with one implementation of the present disclosure.

Figure 6A:
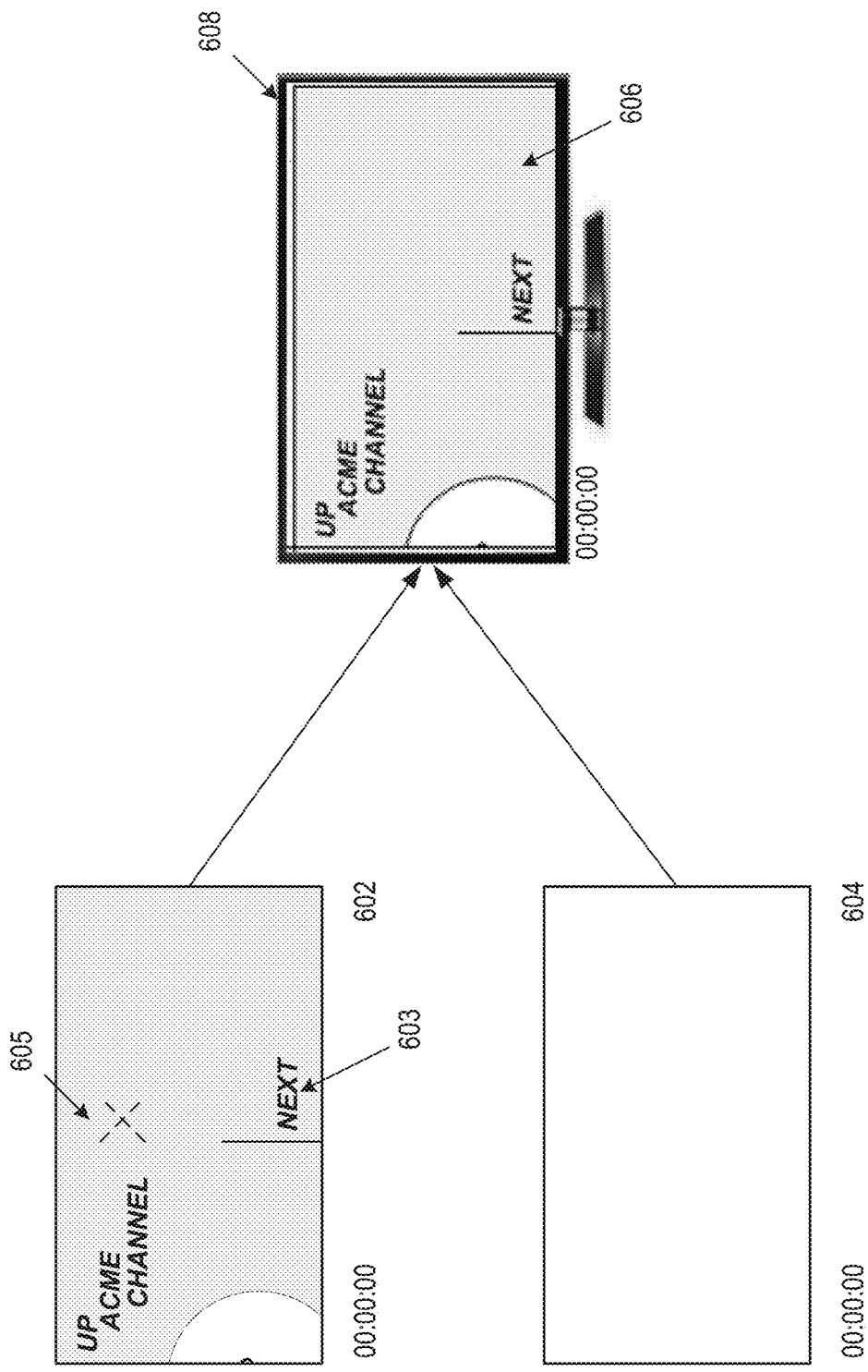
FIGS. 6A-6E depict an example time series of frames of playing a base video and displaying an overlay of an animated presentation of metadata on the playing of the base video to dynamically create a custom transition video for a user, in accordance with one implementation of the present disclosure.

FIG. 6A depicts a point in time 00:00:00. Frame 602 depicts the beginning of playing of the base video at point in time 00:00:00. Frame 604 depicts the result of executing an executable presentation template that corresponds to the base video, and has been populated with metadata items. Executing the populated presentation template results no metadata items yet displayed at point in time 00:00:00. Frame 606 depicts a composite from overlaying frame 604 onto frame 602 to create a custom transition video at point in time 00:00:00 for a particular user. Frame 604 can in a foreground layer on the display 608 and frame 602 can be in a background layer on the display 608. At point in time 00:00:00, frame 604 of the metadata animation does not present any metadata. A client device (e.g., client device 501) can receive configuration parameters (e.g., time codes) specifying how and when to present the metadata on display 608. The client device can execute animations of metadata at particular points in time based on the time codes to synchronize the appearance and disappearance of metadata in a foreground layer on the display 608 with the playing of the base video in a background layer on the display 608. For example, the header text 603 "Next", in the base video, may be floating from the bottom of a display 608 to eventually reach a particular position (e.g., position 605) in the display 608 at a later point in time. The time codes for the base video may specify that the metadata, which corresponds to the header text 603 "Next," should not be presented on the display 608 until the point in time in which the header text 603 "Next" reaches position 605, as illustrated in FIG. 6B.

Figure 6B:
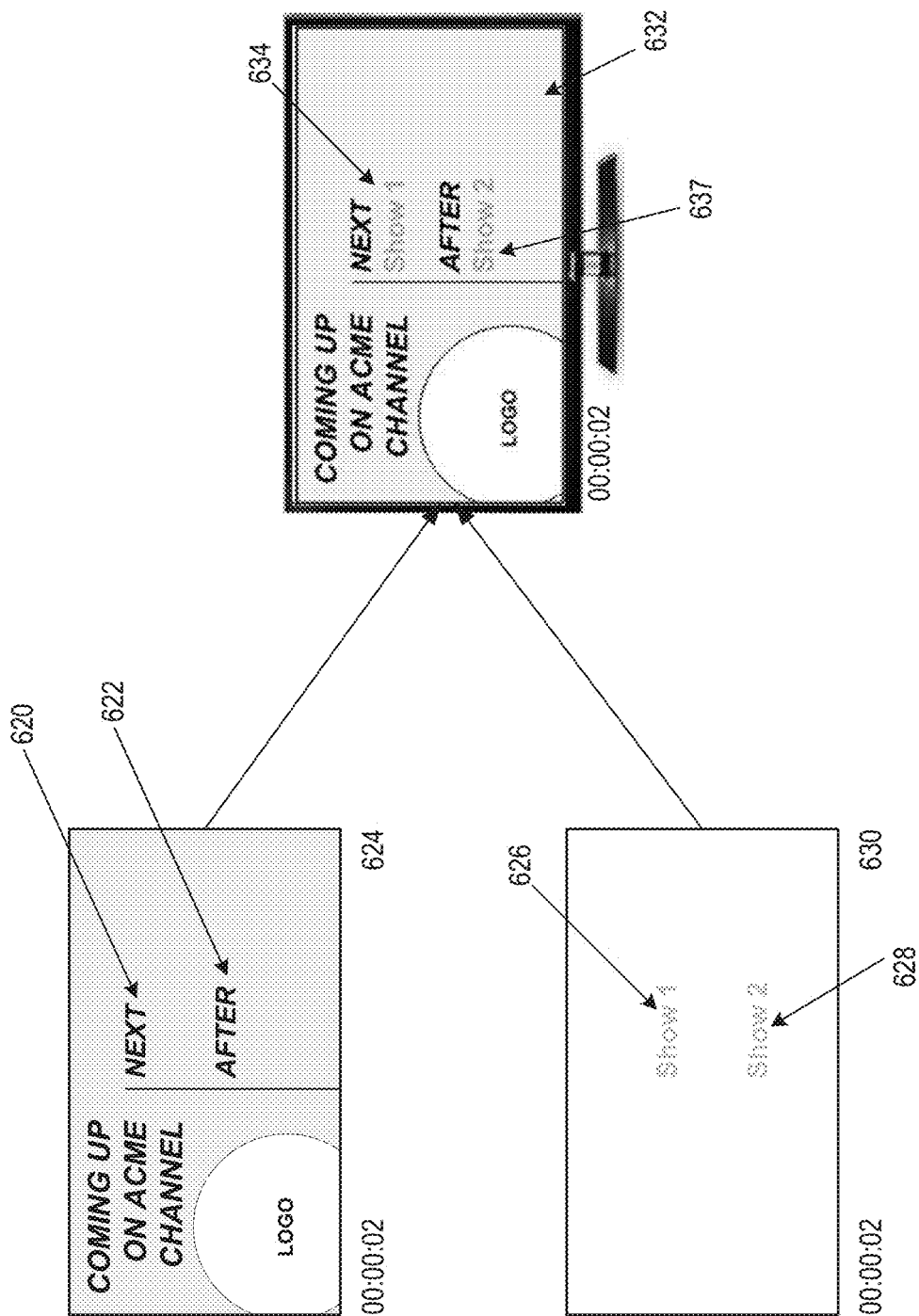

FIG. 6B depicts a frame 624 of the base video playing at point in time 00:00:02 and a frame 630 of the metadata animation at the same point in time. Frame 632 depicts the composite from overlaying frame 630 onto frame 624 to create the custom transition video at the same point in time. In frame 624, each of the header text 620 "Next" and the header text 622 "After" reach a respective particular position. At the same point in time, in frame 630, the title text 626 "Show 1" and the title text 628 "Show 2" fade into view. The base video can have configuration parameters that specify how metadata items should be presented on a display when the executable presentation template for the base video is executed. The configuration parameters may specify that a particular time code, for example 00:00:02, which denotes two seconds from the start of playing the base video, triggers execution of a particular type of animation (e.g., fade in) for the title text 626 "Show 1" and the title text 628 "Show 2" as illustrated in frame 630. The configuration parameters may also specify a transparency value (e.g., 75%) for this particular text and this particular time code. In the frame 632 of the composite, animation (e.g., fade in) of the title text 634 "Show 1" and animation (e.g., fade in) of the title text 637 "Show 2" is in a foreground layer, which is in front of or an overlay on the playing of the base video in a background layer.

Figure 6C:
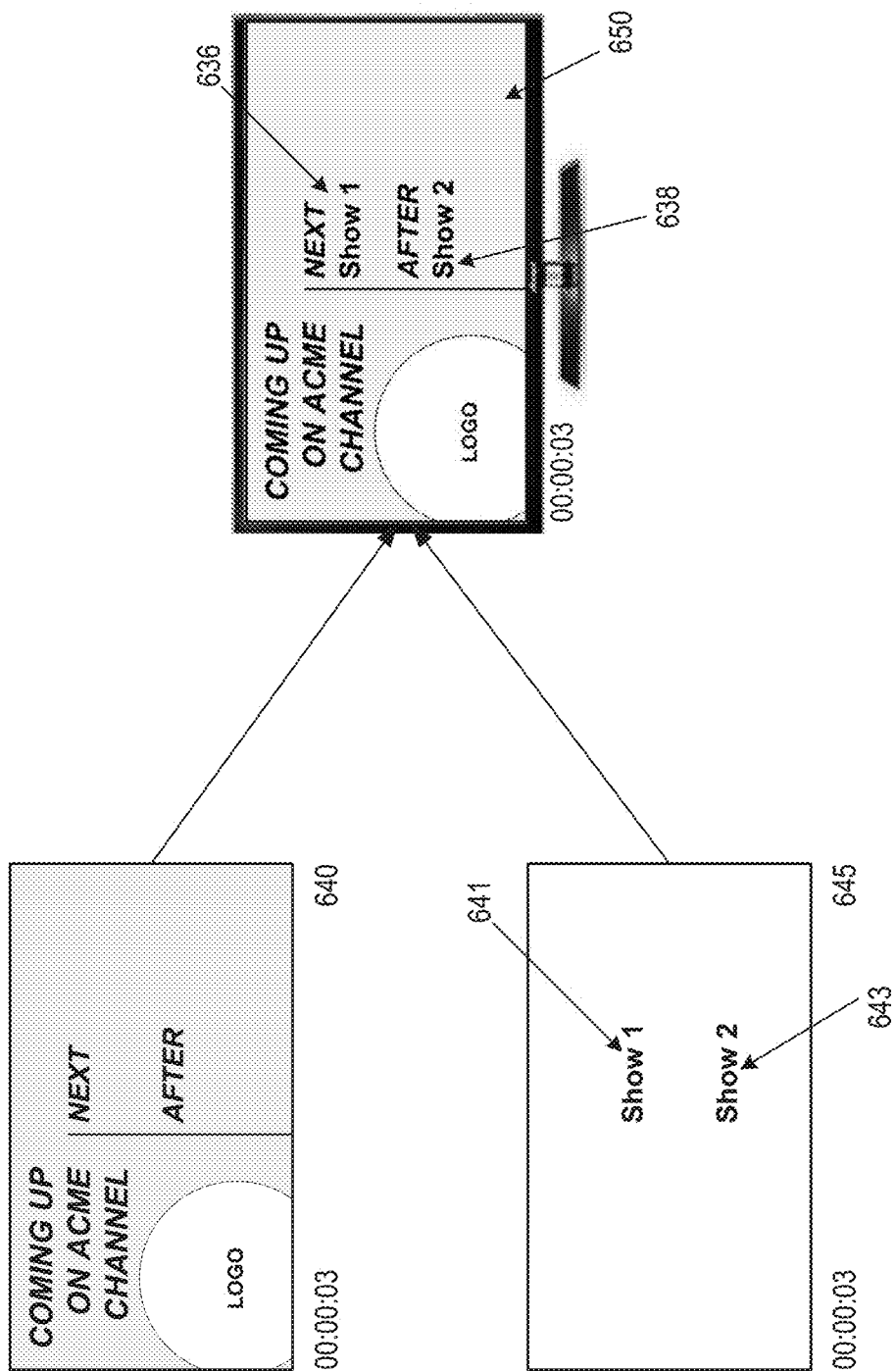

FIG. 6C depicts a frame 640 of the base video playing at point in time 00:00:03 and a frame 645 of the metadata animation at the same point in time. Frame 650 depicts the composite from overlaying frame 645 onto frame 640 to create the custom transition video at the same point in time. In frame 645, the title text 641 "Show 1" and the title text 643 "Show 2" each has fully faded into view. The configuration parameters may specify a transparency value (e.g., 0%) for this particular text and this particular time code. For example, in the frame 650 of the composite, each of the title text 636 "Show 1" and the title text 638 "Show 2" appears in full view (i.e., no transparency).

Figure 6D:
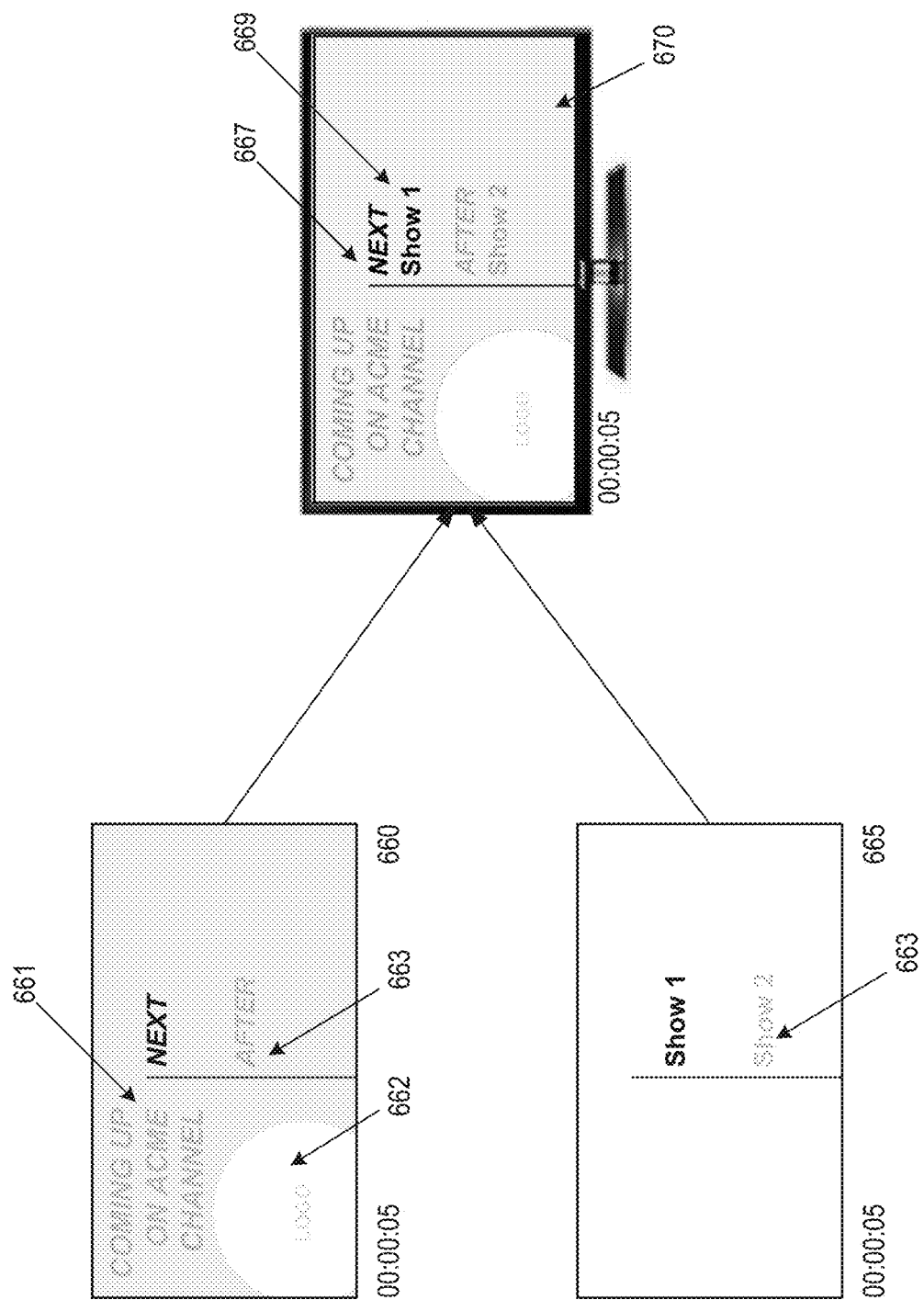

FIG. 6D depicts a frame 660 of the base video playing at point in time 00:00:05 and a frame 665 of the metadata animation at the same point in time. Frame 670 depicts the composite from overlaying frame 665 onto frame 660 to create the custom transition video at the same point in time. In frame 660, each of the text 661 "COMING UP ON ACME CHANNEL," the image 662 of the logo for the ACME channel, and the header text 663 "After" begins to fade out of view during the playing of the base video. The text 661, image 662, and header text 663 continue to disappear as the base video plays, as depicted below in frame 680 at point in time 00:00:07 in FIG. 6E.

Referring to FIG. 6D, in frame 665, the title text 663 "Show 2" in the metadata animation begins to fade out of view. The configuration parameters may specify that this particular time code, for example 00:00:05 that denotes five seconds from the start of playing the base video, triggers execution of a particular type of animation (e.g., fade out) for the title text 663. The configuration parameters may specify a transparency value (e.g., 80%) for this particular text and this particular time code. The title text 663 continues to disappear as the client device continues to execute the metadata animation, as depicted below in frame 685 at point in time 00:00:07 in FIG. 6E. Referring to FIG. 6D, frame 670 of the composite depicts that the header text 667 "Next" and the title text 669 "Show 1" still appear in full view (i.e., no fade out, no transparency).

Figure 6E:
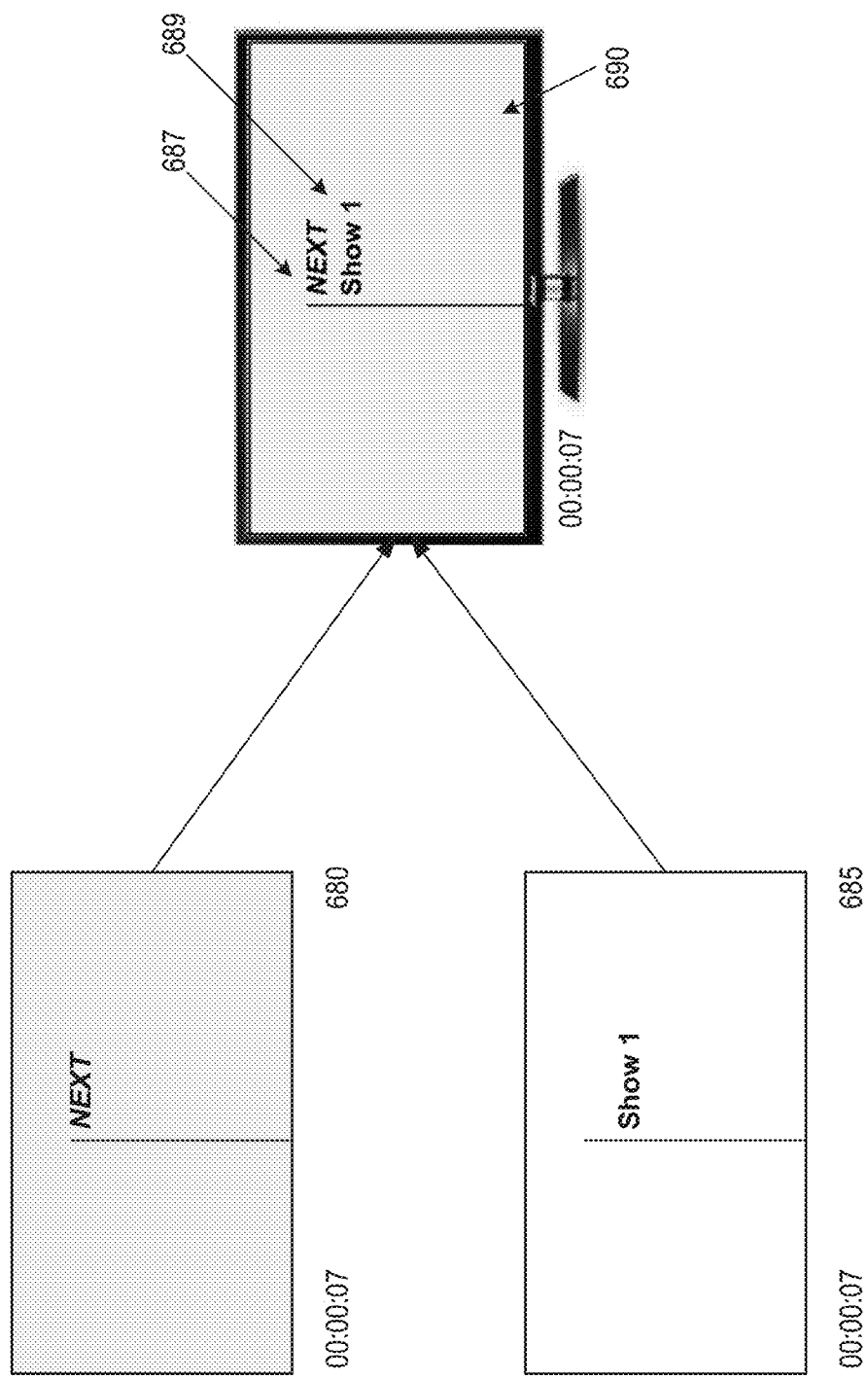

FIG. 6E depicts a frame 680 of the base video playing at point in time 00:00:07 and a frame 685 of the metadata animation at the same point in time. Frame 690 depicts the composite from overlaying frame 685 onto frame 680 to create the custom transition video at the same point in time. Frame 690 of the composite depicts that the header text 687 "Next" and the title text 689 "Show 1" are the only elements of the transition video that appear. The transition video ends at point in time 00:00:08, and the client device can begin playing the next video "Show 1".

Figure 7:
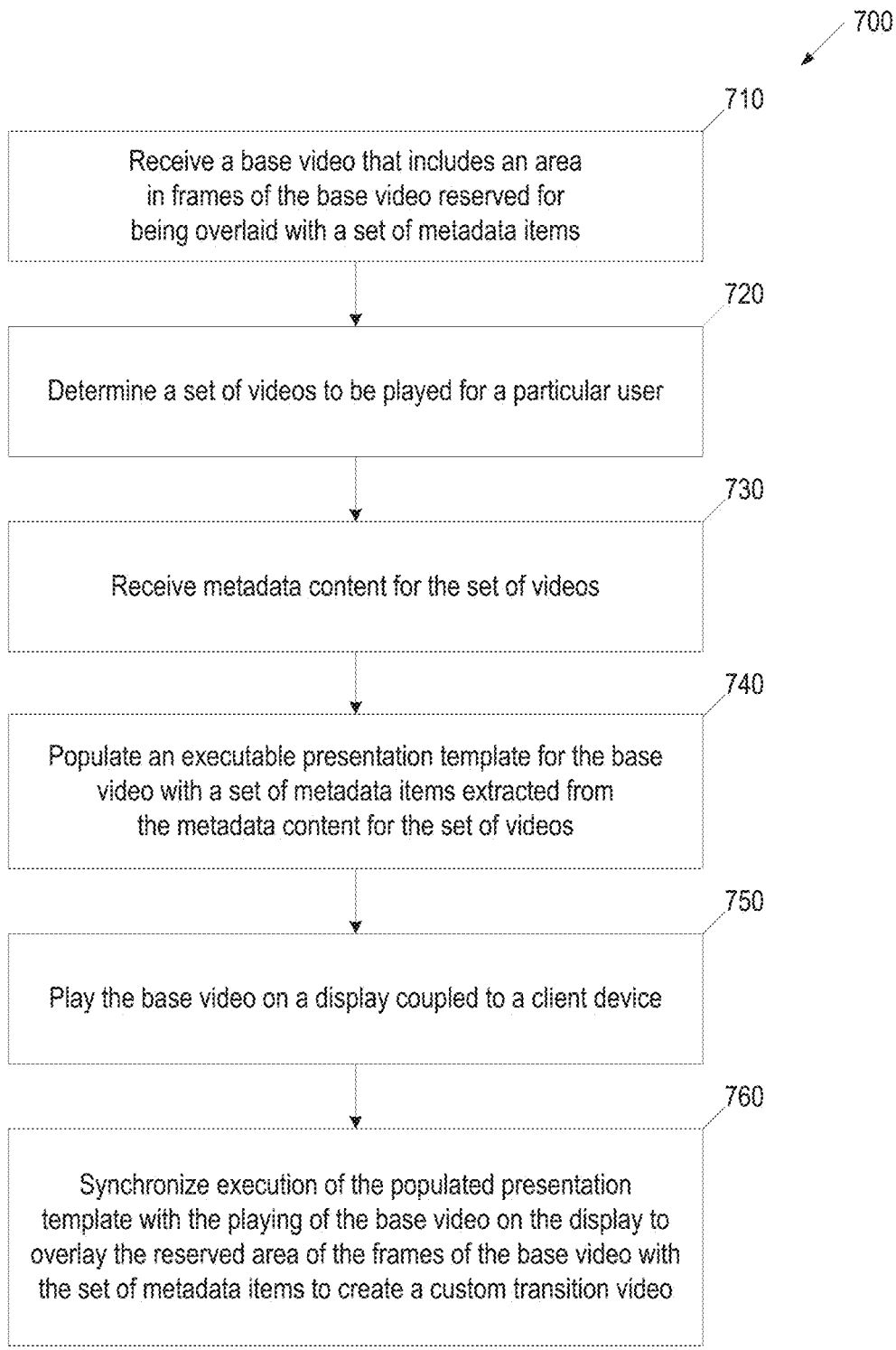
FIG. 7 depicts a flow diagram of aspects of a method for dynamically providing a custom interstitial transition video, in accordance with one implementation of the present disclosure.

FIG. 7 depicts a flow diagram of aspects of a method 700 for dynamically providing a custom interstitial transition video, in accordance with one implementation of the present disclosure. The method 700 is performed by processing logic that may comprise hardware (circuitry, dedicated logic, etc.), software (such as is run on a general purpose computer system or a dedicated machine), or a combination of both. In one implementation, the method is performed by an interstitial component 505 in a client device 501 of FIG. 5. In one implementation, a processing device of a client device performs method 700.

At block 710, the processing device receives a base video to be played by the client device. In one implementation, the processing device receives a base video identifier (e.g., URI). The URI identifies the location of the file of the base video, and the processing devices uses the URI to obtain the file for the base video. When played on a display, the base video includes one or more areas (e.g., areas 302,304 in FIG. 3) in frames of the base video that are reserved for being overlaid with a set of metadata items. The base video and/or the base video identifier can be received from a video streaming server (e.g., video streaming server 515 in FIG. 5).

At block 720, the processing device determines a set of videos to be played next for a particular user. The set of videos can include one or more videos. The selection of the set of videos can be, for example, based on a set of videos previously played by the user, liked by the user, recommended to the user, shared by the user, commented on by the user, added to a playlist by the user, and/or channels subscribed to by the user. In one implementation, the selection of the set of videos can be based on another set of videos that are associated with the particular user. In one implementation, the selection can be made by a recommendation server, and the recommendation server notifies the client device of the selection of the set of videos. In another implementation, the selection of the set of videos is made by a scheduling server, and the scheduling server notifies the client device of the selection of the set of videos. The selection of videos for one user can be different from the selection of videos for another user. In yet another implementation, the client device dynamically selects the set of videos that are to be played next. The processing device can create a custom filler playlist that includes the selected set of videos, as described in greater detail below in conjunction with FIG. 8 and FIG. 9.

At block 730, the processing device receives metadata content for the set of videos. The metadata content can be received from the recommendation server or the scheduling server. The metadata content can be received at the same time the base video is received. In one implementation, the video streaming server sends an instruction to the recommendation server or the scheduling server to send the metadata content to the client device.

At block 740, the processing device populates a presentation template for the base video with a set of metadata items extracted from the metadata content for the selected set of videos. The presentation template can be executable code, which when executed results in animation of one or more individual metadata items in the set of metadata items on a display coupled to the processing device. The set of metadata items can include at least one of a title, a creator, a channel, one or more keywords, or statistics for respective videos in the selected set of videos.

The processing device can use the base video identifier to select a presentation template that corresponds to the base video identifier. In one implementation, the processing device accesses mapping data stored in a data store that maps base video identifiers to presentations templates. For example, a video streaming service can include an extreme sports channel that has data content having an extreme sports theme and can include a gardening channel that has data content having a gardening theme. The base video identifier for the extreme sports channel can map to a presentation template for the extreme sports channel, and the base video identifier for the gardening channel can map to a presentation template for the gardening channel.

At block 750, the processing device plays the base video on a display coupled to the client device. In one implementation, the display is coupled to a streaming device that supports mirroring and/or casting technology. The base video can include audio (e.g., music). In one implementation, the display is a display of the client device. For example, the display may be a display of a smart phone or a tablet computer. In another implementation, the display is coupled to a streaming device that supports mirroring and/or casting technology. The streaming device and client device can be connected to the same network (e.g., wireless network), and the client device can play the base video on the display coupled to the streaming device. In one implementation, the processing device executes a media player to play the base video.

At block 760, the processing device synchronizes execution of the populated presentation template with the playing of the base video on the display to overlay the reserved area of the frames of the base video with the set of metadata items. When the populated presentation template is executed, the reserved area of the frames of the base video playing on the display is overlaid with animation of one or more individual metadata items in the set of metadata items. The synchronizing creates a custom transition video that informs the particular user about the set of videos to be played next. Immediately following the end of the synchronized execution of the populated presentation template with the playing of the base video, the processing device can play the video in the set of videos that has been selected to be played next.

For the synchronizing, the processing device can receive, from the video streaming server, configuration parameters for displaying the metadata items, which are in the populated presentation template, on to the display coupled to the processing device. The configuration parameters can include a set of time codes and one or more of a font style, a font size, a font color, a position, or a type of animation. The processing device can use the configuration parameters to display the metadata items in the populated presentation template and synchronize the display of the metadata items with the playing of the base video. For example, the font related parameters can specify which font style, font size, and font color should be used to display a particular metadata item. The position parameter can specify X-Y coordinates for positioning a particular metadata item on the display. The animation parameter can specify which type of animation to execute for displaying a particular metadata item. The configuration parameters correspond to a particular base video. For example, the configuration parameters for a base video for an extreme sports channel may be different from the configuration parameters for a base video for a gardening channel.

When the processing device executes the populated presentation template one or more specific metadata items can be presented on the display at specific points in time based on the set of time codes. The time codes can specify one or more points in time for executing an animation of one or more particular metadata items in the set of metadata items in the populated presentation template on the display. The synchronization of the execution of the populated presentation template with the playing of the base video can be based on a start time for playing the base video. In one implementation, the processing device can determine a timestamp of when the base video started to play and can use the timestamp as a reference time for the time codes. The time codes can be represented as seconds.

The execution of the populated presentation template executes animation of particular metadata items on the display according to the set of time codes. The set of time codes can include a first point in time to execute a first type of animation for a respective metadata item on the display and a second point in time to execute a second type of animation on the respective metadata item on the display. For example, the processing device may receive time code 00:00:02, and when the populate presentation template is executed, a fade in animation of two video titles is executed two seconds from the time when the base video started to play to display the fade in animation of two video titles as illustrated in frame 630 in FIG. 6B, and point in time 00:00:05 may trigger a fade out animation of one of the video titles, as illustrated in frame 665 in FIG. 6D. The types of animation can include, for example, and not limited to, fading in, fading out, bouncing in, bouncing out, spinning in, spinning out, floating in, and floating out.

Figure 8:
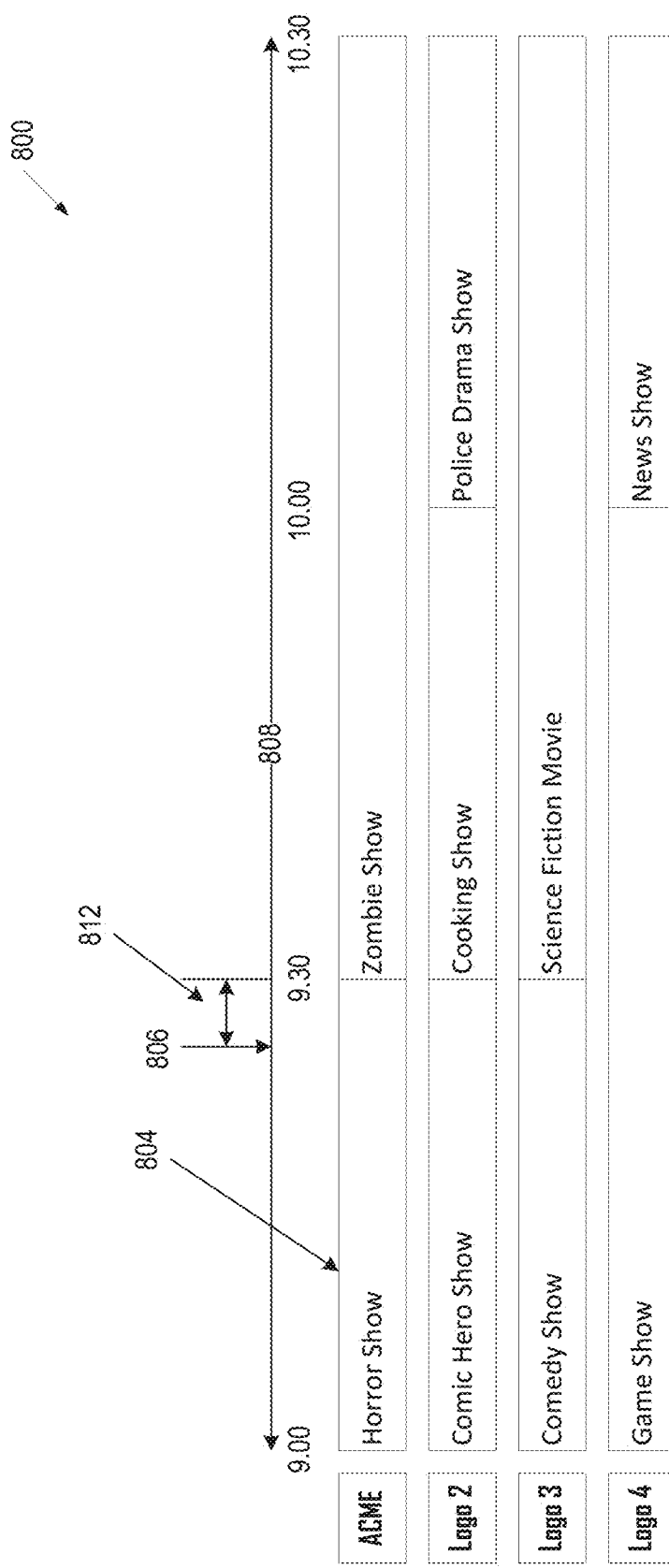
FIG. 8 depicts an example of a video streaming user interface displaying an interactive schedule of videos to be streamed and played, in accordance with one implementation of the present disclosure.

FIG. 8 depicts an example of a video streaming user interface 800 displaying an interactive schedule of videos to be streamed and played, in accordance with one implementation of the present disclosure. The schedule can be pre-defined, for example, by a scheduling server (e.g., scheduling server 515 in FIG. 5). The user interface 800 can be a graphical user interface.

The user interface can include a timeline 808 that includes time markers (e.g., "9.00", "9.30", "10.00", "10.30") for a schedule for playing the videos. In one implementation, the periods of time between markers in the timeline 808 are the same. In one implementation, the periods of time are 30-minute blocks of time. The user interface 800 can include visual representations for each of the scheduled videos. In one implementation, a visual representation of a scheduled video is a cell (e.g., cell 804) that displays a video identifier (e.g., video title) of the corresponding scheduled video. For example, cell 804 includes a title "Horror Show." One or more of the scheduled videos can be associated with a content provider. For example, the video "Horror Show" and the video "Zombie Show" can be associated with content provider "ACME".

Videos can be scheduled to play at intervals or multiples of 30-minute blocks of times, for example, at the top of or at the half hour. A video streaming service provider can assign channels to content providers, and the videos of the content providers can be played according to the schedule via a respective channel. For example, the video "Horror Show" is scheduled to play at 9:00 pm on the ACME channel and the video "Zombie Show" is scheduled to play at 9:30 pm on the ACME channel.

A user may select the ACME channel or particular video (e.g., Horror Show) from a video streaming user interface to watch the particular video that is being played on the ACME channel according to the schedule. The user may select the video "Horror Show" at a point in time (e.g., point in time 806) in which the video has a period of time 812 of 7 minutes left to be played before the video "Horror Show" ends. At point in time 806, there is 7 minutes remaining in the "Horror Show" video before the next video "Zombie Show" is played on the ACME channel.

The client device (e.g., client device 501 in FIG. 5) can include a playlist component (e.g., playlist component 506 in FIG. 5) to dynamically create a custom filler playlist of videos for the particular user to fill a period of time 806 (e.g., 7 minutes) until a next video (e.g., "Zombie Show") is played. The filler playlist can include one or more videos. In one implementation, a custom transition video can be played between videos in the filler playlist to notify the user of the next video(s) to be played. In one implementation, the videos that are selected for the filler playlist are associated with the current channel that the user has selected. In another implementation, the videos that are selected for the filler playlist are not associated with the current channel that the user has selected. In one implementation, the selection of videos for the custom filler playlist is based on videos that the user has watched, liked, shared, added to a playlist, commented on, channel subscriptions, etc.

Figure 9:
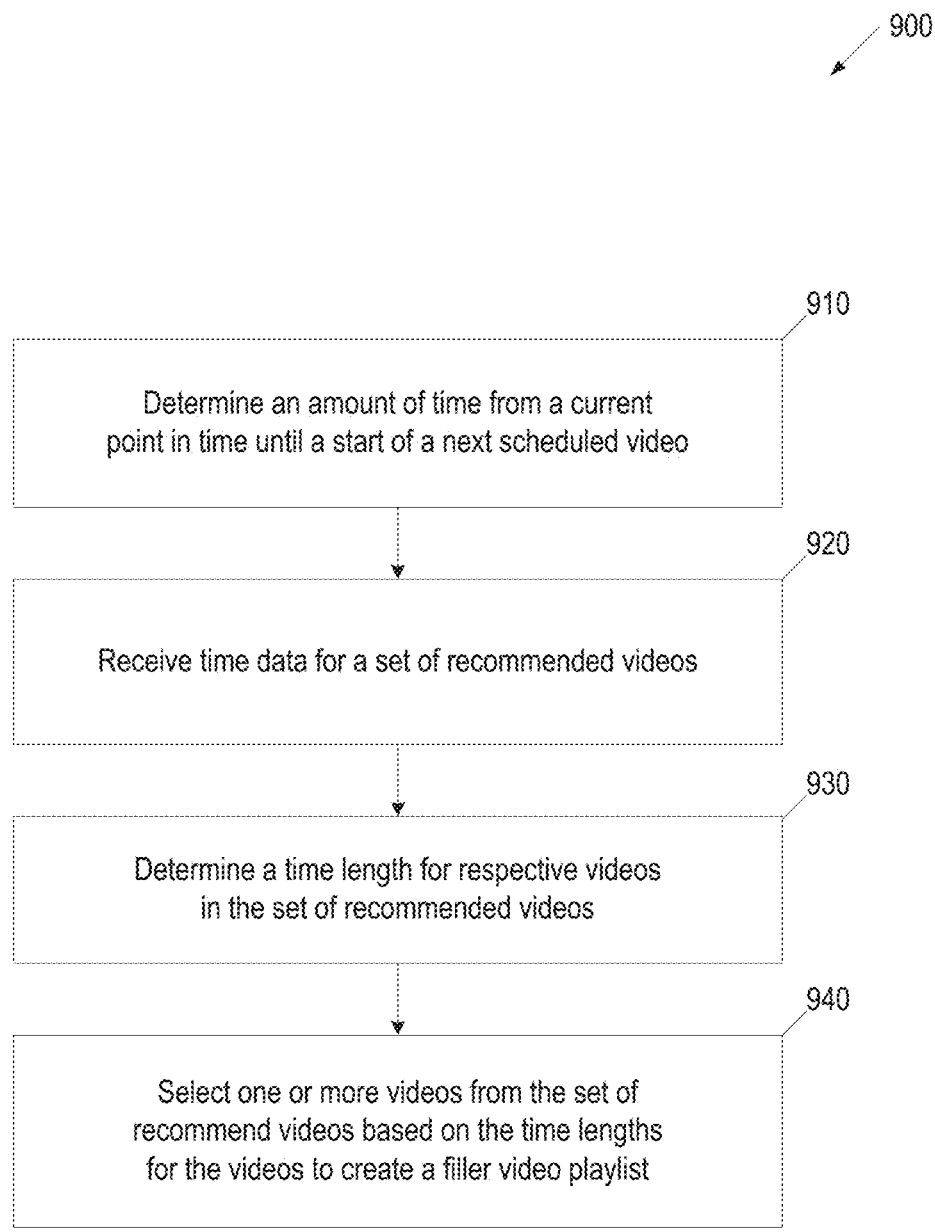
FIG. 9 depicts a flow diagram of aspects of a method for dynamically providing a custom filler video playlist, in accordance with one implementation of the present disclosure.

FIG. 9 depicts a flow diagram of aspects of a method 900 for dynamically providing a custom filler video playlist, in accordance with one implementation of the present disclosure. The method 900 is performed by processing logic that may comprise hardware (circuitry, dedicated logic, etc.), software (such as is run on a general purpose computer system or a dedicated machine), or a combination of both. In one implementation, the method is performed by a playlist component (e.g., playlist component 506 in FIG. 5) in a client device. In one implementation, a processing device of a client device performs method 900.

At block 910, the processing device determines an amount of time from a current point in time until a start of a next scheduled video. The current point in time can be a time when a user executes an instance of a video streaming user interface or when a user selects a channel or a video via the video streaming user interface. The processing device can access schedule data to determine the start time for the next scheduled video. The schedule data can be stored in a data store (e.g., data store 513 in FIG. 5).

At block 920, the processing device receives time data for a set of recommended videos from a recommendation server (e.g., recommendation server 517 in FIG. 5). The set of videos can be selected by the recommendation server. In one implementation, the set of videos is selected, for example, based on videos that the user has watched, liked, shared, added to a playlist, commented on, channel subscriptions, based on the channel that the user has selected, and/or based on a video that is currently playing.

At block 930, the processing device determines a time length for respective videos in the set of recommended videos. The time data can include time length of a respective video. At block 940, the processing device selects one or more videos from the set of recommended videos to create the filler video playlist. The processing device can select the video(s) based on the time length of the videos and the amount of time from a current point in time until a start of a next scheduled video. For example, the amount of time from a current point in time until a start of a next scheduled video may be 7 minutes, and the processing device can select a single video from the set of recommended videos that has a time length of 7 minutes for the filler playlist. In another example, the processing device may select a first video that is 3 minutes long, a second video that is 1.3 minutes long, and a third video that is 2.7 minutes long for the filler playlist.

In one implementation, the processing device automatically plays the first video in the filler video playlist. In another implementation, the processing device displays a visual representation (e.g. thumbnail) of the first video in the filler video playlist in video streaming user interface. The user may select the visual representation of the first video in the user interface to start playing the first video.

Figure 10:
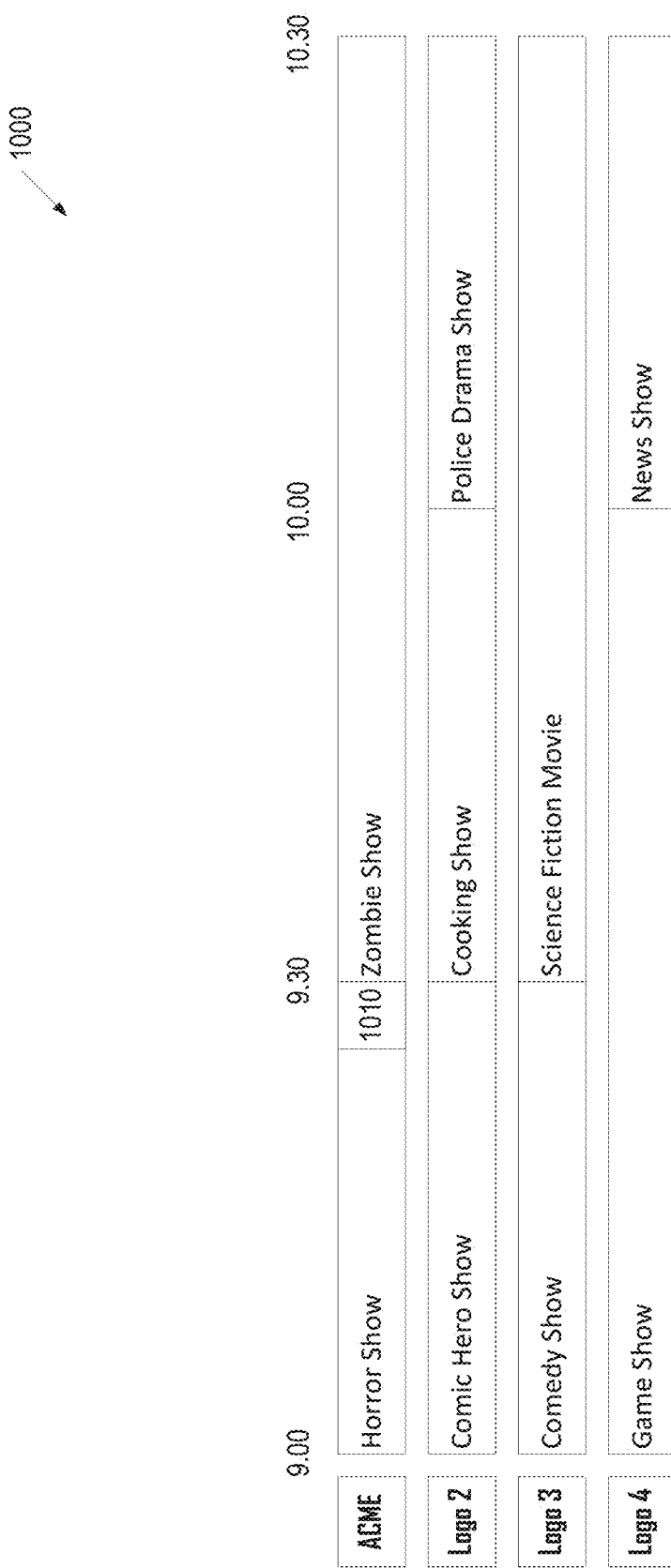
FIG. 10 depicts an example of a video streaming user interface displaying a visual representation of a video in the filler playlist, in accordance with one implementation of the present disclosure.

FIG. 10 depicts an example of a video streaming user interface 1000 displaying a visual representation 1010 of a video in the filler playlist, in accordance with one implementation of the present disclosure. The video representation 1010 can be of the first video in the filler playlist. The video representation 1010 can include one or more of a thumbnail of the video, a title of the video, a length of time for the video, a creator or owner of the video, and statistics for the video. The video representation 1010 can interactive. For example, a user can select video representation 1010 to trigger playing the video.

Figure 11:
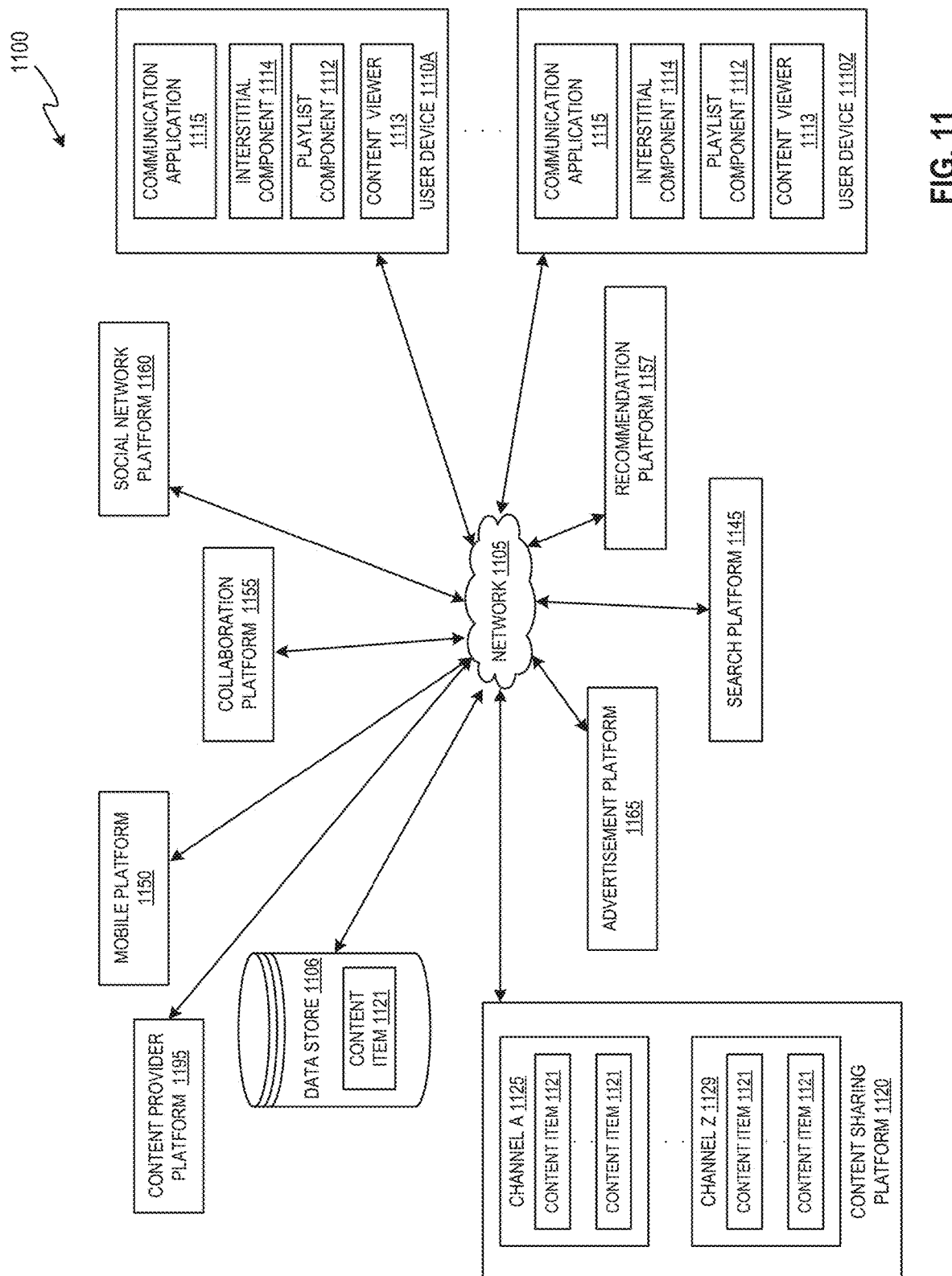
FIG. 11 illustrates an example of system architecture for dynamically providing custom transition videos, in accordance with one implementation of the disclosure.

FIG. 11 illustrates an example of system architecture 1100 for dynamically providing custom transition videos, in accordance with one implementation of the disclosure. The system architecture 1100 includes user devices 1110A through 1110Z, one or more networks 1105, one or more data stores 1106, one or more servers 1130, and one or more platforms (e.g., content sharing platform 1120, recommendation platform 1157, advertisement platform 1165, mobile platform 1150, social network platform 1160, search platform 1145, content provider platform 1195, and collaboration platform 1155). The platforms can be one or more computing devices (such as a rackmount server, a router computer, a server computer, a personal computer, a mainframe computer, a laptop computer, a tablet computer, a desktop computer, etc.), data stores (e.g., hard disks, memories, and databases), networks, software components, and/or hardware components.

The one or more networks 1105 can include one or more public networks (e.g., the Internet), one or more private networks (e.g., a local area network (LAN) or one or more wide area networks (WAN)), one or more wired networks (e.g., Ethernet network), one or more wireless networks (e.g., an 802.11 network or a Wi-Fi network), one or more cellular networks (e.g., a Long Term Evolution (LTE) network), routers, hubs, switches, server computers, and/or a combination thereof. In one implementation, some components of architecture 1100 are not directly connected to each other. In one implementation, architecture 1100 includes separate networks 1105.

The one or more data stores 1106 can be memory (e.g., random access memory), cache, drives (e.g., hard drive), flash drives, database systems, or another type of component or device capable of storing data. The one or more data stores 1106 can include multiple storage components (e.g., multiple drives or multiple databases) that may also span multiple computing devices (e.g., multiple server computers). The data stores 1106 can be persistent storage that are capable of storing data. A persistent storage can be a local storage unit or a remote storage unit. Persistent storage can be a magnetic storage unit, optical storage unit, solid state storage unit, electronic storage units (main memory), or similar storage unit. Persistent storage can be a monolithic device or a distributed set of devices. A 'set', as used herein, refers to any positive whole number of items.

Content items 1121 can be stored in one or more data stores 1106. The data stores 1106 can be part of one or more platforms. Examples of a content item 1121 can include, and are not limited to, digital video, digital movies, animated images, digital photos, digital music, digital audio, website content, social media updates, electronic books (ebooks), electronic magazines, digital newspapers, digital audio books, electronic journals, web blogs, real simple syndication (RSS) feeds, electronic comic books, software applications, etc. Content item 1121 is also referred to as a media item. For brevity and simplicity, an online video (also hereinafter referred to as a video) is used as an example of a content item 1121 throughout this document. The content items 1121 can include main videos (e.g., main videos 102,110,118,126 in FIG. 1) and interstitial transition videos (e.g., interstitial transition videos 106,114,122 in FIG. 1).

The content items 1121 can be provided by content providers. A content provider can be a user, a company, an organization, etc. A content provider can provide contents items 1121 that are video advertisements. A content provider that provides video advertisements is hereinafter referred to as an advertiser. For example, a content item 1121 may be a video advertisement for a car provided by a car advertiser. A service provider can charge an advertiser a fee, for example, when the service provider provides the advertisements on user devices 1110A-1110Z to be viewed by users.

The user devices 1110A-1110Z can include devices, such as, smart phones, cellular telephones, personal digital assistants (PDAs), portable media players, netbooks, laptop computers, electronic book readers, tablet computers, desktop computers, set-top boxes, gaming consoles, televisions, and the like. The user devices 1110A-1110Z can be client devices (e.g., client device 501 in FIG. 5).

The individual user devices 1110A-1110Z can include a communication application 1115. A content item 1121 can be consumed via a communication application 1115, the Internet, etc. As used herein, "media," "media item," "online media item," "digital media," "digital media item," "content," and "content item" can include an electronic file that can be executed or loaded using software, firmware or hardware configured to present a content item. In one implementation, the communication applications 1115 may be applications that allow users to compose, send, and receive content items 1121 (e.g., videos) over a platform (e.g., content sharing platform 1120, recommendation platform 1157, advertisement platform 1165, mobile platform 1150, social network platform 1160, search platform 1145, collaboration platform 1155, and content provider platform 1195) and/or a combination of platforms and/or networks.

For example, the communication application 1115 may be a social networking application, video sharing application, video streaming application, video on demand application, photo sharing application, chat application, mobile application of a content provider or any combination of such applications. The communication application 1115 in a user device can render, display, and/or present one or more content items 1121 (e.g., videos) to one or more users. For example, the communication application 1115 can provide one or more user interfaces (e.g., graphical user interfaces) to be rendered in a display of a user device for sending, receiving and/or playing videos.

In one implementation, the individual user devices 1110A-1110Z include a content viewer 1113 (e.g., application 503 in FIG. 5) to render, display, and/or present content items 221 (e.g., videos) to one or more users. In one implementation, a content viewer 1113 is embedded in an application (e.g., communication application 1115). In another implementation, the content viewer 1113 may be a standalone application (e.g., mobile application, desktop application, gaming console application, television application, etc.), such as communication application 1115, that allows users to consume (e.g., play, display) content items 1121, such as videos, images, documents (e.g., web pages), etc. For example, the content viewer 1113 may be a web browser that can access, retrieve, present, and/or navigate content (e.g., web pages such as Hyper Text Markup Language (HTML) pages, digital media items, etc.) served by a web server of a platform. In another example, the content viewer 1113 may display an embedded media player (e.g., a Flash® player or an HTML5 player) that is embedded in a document (e.g., a web page).

The content viewers 1113 can be provided to the user devices 1110A-1110Z by a server 1130 and/or a platform. For example, the content viewers 1113 may be embedded media players that are embedded in documents (e.g., web pages) provided by the content sharing platform 1120. In another example, the content viewers 1113 may be applications that are downloaded from a platform (e.g., content sharing platform 1120, recommendation platform 1157, advertisement platform 1165, mobile platform 1150, social network platform 1160, search platform 1145, collaboration platform 1155, and content provider platform 1195). In another example, the content viewers 1113 may be standalone applications that are pre-installed on the user devices 1110A-1110Z.

In one implementation, the individual user devices 1110A-1110Z include an interstitial component 1114 (e.g., interstitial component 505 in FIG. 5) to dynamically create and play custom transition videos. In one implementation, the individual user devices 1110A-1110Z includes a playlist component 1112 (e.g., playlist component 503 in FIG. 5) to dynamically create a custom filler playlist of videos for a particular user to fill a period of time (e.g., 7 minutes) until a next video is played.

The content provider platform 1195 can provide a service and the content provider can be the service provider. For example, a content provider may be a video streaming service provider that provides a media streaming service via a communication application 1115 for users to play videos, TV shows, video clips, audio, audio clips, and movies, on user devices 1110A-1110Z via the content provider platform 1195.

The social network platform 1160 can provide an online social networking service. The social network platform 1160 can provide a communication application 1115 for users to create profiles and perform activity with their profile. Activity can include updating a profiling, exchanging messages with other users, posting status updates, photos, videos, etc. to share with other users, evaluating (e.g., like, comment, share, recommend) status updates, photos, videos, etc., and receiving notifications of other users activity.

The mobile platform 1150 can be and/or include one or more computing devices (e.g., servers), data stores, networks (e.g., phone network, cellular network, local area network, the Internet, and/or a combination of networks), software components, and/or hardware components that can be used to allow users to connect to, share information, and/or interact with each other using one or more mobile devices (e.g., phones, tablet computers, laptop computers, wearable computing devices, etc.) and/or any other suitable device. For example, the mobile platform 1150 may enable telephony communication, Short Message Service (SMS) messaging, Multimedia Message Service (MMS) messaging, text chat, and/or any other communication between users. The mobile platform 1150 can support user communications via video messaging, video chat, and/or videoconferences.

The collaboration platform 1155 can enable collaboration services, such as video chat, video messaging, and audio and/or videoconferences (e.g., among the users of devices 1110A-1110Z) using, for example, streaming video or voice over IP (VoIP) technologies, cellular technologies, LAN and/or WAN technologies, and may be used for personal, entertainment, business, educational or academically oriented interactions.

The recommendation platform 1157 can be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that can be used to generate and provide content recommendations (e.g., articles, videos, posts, news, games, etc.). The recommendation platform 1157 can include one or more recommendation servers (e.g., recommendation server 517 in FIG. 5).

The search platform 1145 can be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that can be used to allow users to query the one or more data stores 206 and/or one or more platforms and receive query results.

The advertisement platform 1165 can be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that can be used provide video advertisements.

The content sharing platform 1120 can be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that can be used to provide one or more users with access to content items 1121 and/or provide the content items 1121 to one or more users. For example, the content sharing platform 1120 may allow users to consume, upload, download, and/or search for content items 1121. In another example, the content sharing platform 1120 may allow users to evaluate content items 1121, such as, approve of ("like"), dislike, recommend, share, rate, and/or comment on content items 1121. In another example, the content sharing platform 1120 may allow users to edit content items 1121. The content sharing platform 1120 can also include a website (e.g., one or more webpages) and/or one or more applications (e.g., communication applications 1115) that may be used to provide one or more users with access to the content items 1121, for example, via user devices 1110A-1110Z. Content sharing platform 1120 can include any type of content delivery network providing access to content items 1121.

The content sharing platform 1120 can include multiple channels (e.g., Channel A 1125 through Channel Z 1129). A channel can be data content available from a common source or data content having a common topic or theme. The data content can be digital content chosen by a user, digital content made available by a user, digital content uploaded by a user, digital content chosen by a content provider, digital content chosen by a broadcaster, etc. For example, Channel A 1125 may include videos Y and Z. A channel can be associated with an owner, who is a user that can perform actions on the channel. The data content can be one or more content items 1121. Although channels are described as one implementation of a content sharing platform, implementations of the disclosure are not limited to content sharing platforms that provide content items 1121 via a channel model.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

Figure 12:
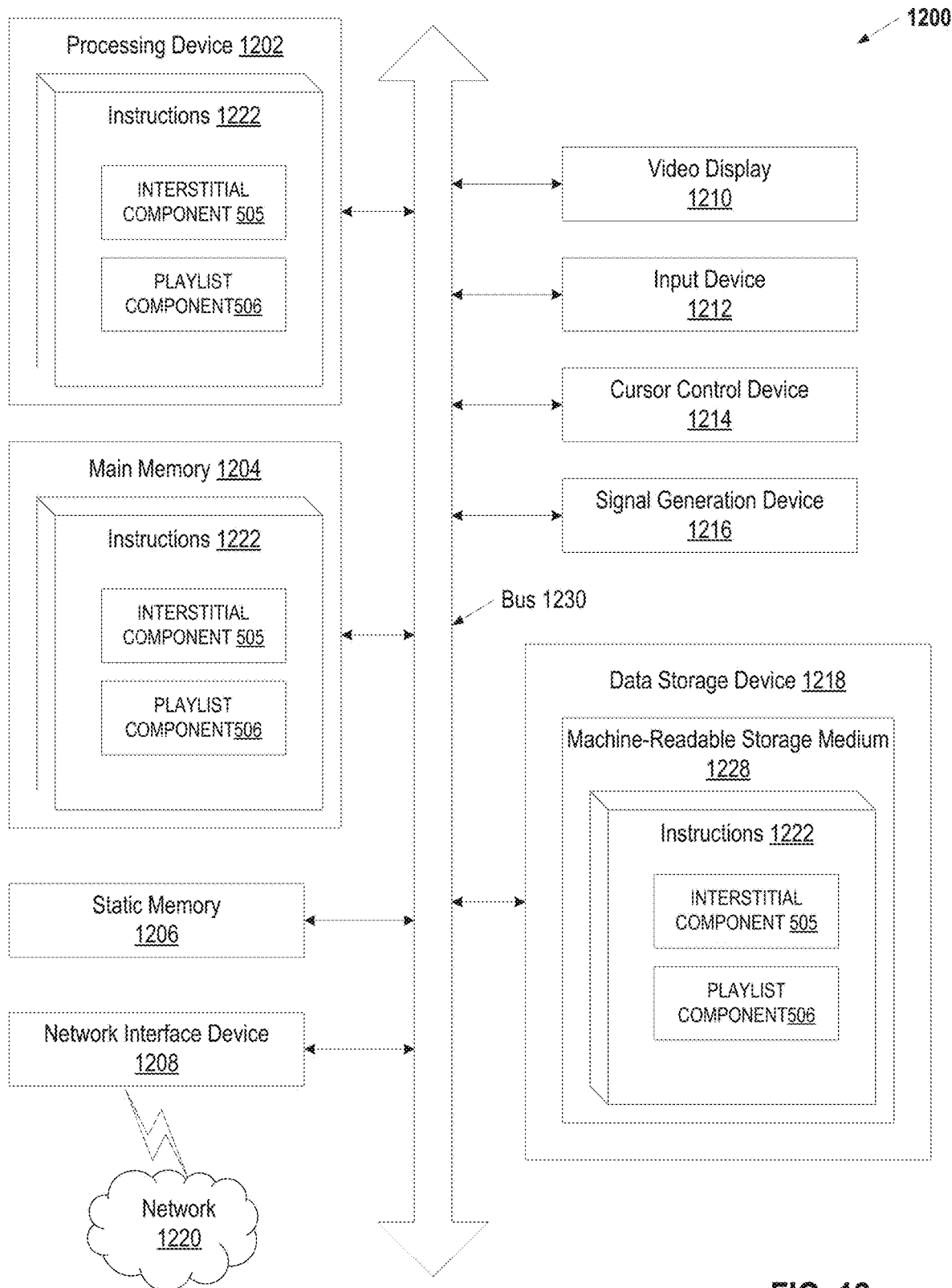
FIG. 12 depicts a block diagram of an example computing device operating in accordance with one or more aspects of the present disclosure.

FIG. 12 illustrates a diagram of a machine in an example form of a computer system 1200 within which a set of instructions, for causing the machine to perform any one or more of the methodologies discussed herein, can be executed, in accordance with one implementation of the present disclosure. The computer system 1200 can be client device 501 in FIG. 5. The machine can operate in the capacity of a client machine in client-server network environment, or as a peer machine in a peer-to-peer (or distributed) network environment. The machine can be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1200 includes a processing device (processor) 1202, a main memory 1204 (e.g., read-only memory (ROM), flash memory, dynamic random access memory (DRAM) such as synchronous DRAM (SDRAM), double data rate (DDR SDRAM), or DRAM (RDRAM), etc.), a static memory 1206 (e.g., flash memory, static random access memory (SRAM), etc.), and a data storage device 1218, which communicate with each other via a bus 1230.

Processor (processing device) 1202 represents one or more general-purpose processing devices such as a microprocessor, central processing unit, or the like. More particularly, the processor 1202 can be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 1202 can also be one or more special-purpose processing devices such as an application specific integrated circuit (ASIC), a field programmable gate array (FPGA), a digital signal processor (DSP), network processor, or the like. The processor 1202 is configured to execute instructions 1222 for performing the operations and steps discussed herein.

The computer system 1200 can further include a network interface device 1208. The computer system 1200 also can include a video display unit 1210 (e.g., a liquid crystal display (LCD) or a cathode ray tube (CRT)), an input device 1212 (e.g., a keyboard, and alphanumeric keyboard, a motion sensing input device, touch screen), a cursor control device 1214 (e.g., a mouse), and a signal generation device 1216 (e.g., a speaker).

The data storage device 1218 can include a non-transitory computer-readable storage medium 1228 on which is stored one or more sets of instructions 1222 (e.g., software) embodying any one or more of the methodologies or functions described herein. The instructions 1222 can also reside, completely or at least partially, within the main memory 1204 and/or within the processor 1202 during execution thereof by the computer system 1200, the main memory 1204 and the processor 1202 also constituting computer-readable storage media. The instructions 1222 can further be transmitted or received over a network 1220 via the network interface device 1208.

In one implementation, the instructions 1222 include instructions for an interstitial component (e.g., interstitial component 505 in FIG. 5) and/or a software library containing methods that call the interstitial component. In one implementation, the instructions 1222 include instructions for a playlist component (e.g., playlist component 506 in FIG. 5) and/or a software library containing methods that call the playlist component. While the computer-readable storage medium 1228 (machine-readable storage medium) is shown in an exemplary implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure can be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "determining", "populating", "synchronizing", "playing", "selecting", "creating", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

For simplicity of explanation, the methods are depicted and described herein as a series of acts. However, acts in accordance with this disclosure can occur in various orders and/or concurrently, and with other acts not presented and described herein. Furthermore, not all illustrated acts can be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Certain implementations of the present disclosure also relate to an apparatus for performing the operations herein. This apparatus can be constructed for the intended purposes, or it can comprise a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Reference throughout this specification to "one implementation" or "an implementation" means that a particular feature, structure, or characteristic described in connection with the implementation is included in at least one implementation. Thus, the appearances of the phrase "in one implementation" or "in an implementation" in various places throughout this specification are not necessarily all referring to the same implementation. In addition, the term "or" is intended to mean an inclusive "or" rather than an exclusive "or." Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

In one implementation, if a video in the filler playlist is only partially played, the client device updates the set of videos in the filler playlist. For example, if only 0.5 minutes of the 3 minute video is played because the user stopped the video, the processing device recalculate the amount of time from a current point in time until a start of a next scheduled video, and modifies the set of videos in the filler playlist based on the recalculation.

An apparatus to dynamically providing a custom interstitial transition video is also described. In one implementation, the apparatus includes means for receiving a base video to be played by a client device. The base video comprises an area in frames of the base video reserved for being overlaid with a set of metadata items. The apparatus includes means for determining, by the client device, a first set of videos to be played next for a particular user. The selection of the first set of videos is based on a second set of videos associated with the particular user.

The apparatus includes means for receiving, by the client device from a server, metadata content for the first set of videos, and means for populating, by the client device, an executable presentation template for the base video with a set of metadata items extracted from the metadata content for the first set of videos.

The apparatus includes means for playing, by the client device, the base video on a display coupled to the client device and means for synchronizing, by the client device, execution of the populated presentation template with the playing of the base video on the display to overlay the reserved area of the frames of the base video with the set of metadata items. The synchronizing creates a custom interstitial transition video that informs the particular user about the first set of videos to be played next.

The execution of the populated presentation template results in animation of one or more individual metadata items in the set of metadata items on the display coupled to the client device, and the reserved area of the frames of the base video playing on the display is overlaid with the animation of the one or more individual metadata items in the set of metadata items. The apparatus includes means for receiving a set of times codes for the base video. The time codes specify one or more points in time for executing an animation of a respective metadata item in the set of metadata items in the populated presentation template on the display and means for executing the animation of the respective metadata item in the set of metadata items on the display coupled to the client device according to the set of time codes. The set of time codes comprises a first point in time to execute a first type of animation for a respective metadata item on the display and a second point in time to execute a second type of animation for a respective metadata item on the display.

The apparatus includes means for receiving configuration parameters for displaying the metadata items in the populated presentation template on the display coupled to the client device. The configuration parameters comprise at least one of a font style, a font size, a font color, a text position, or a type of animation. The apparatus includes means for displaying the metadata items in the populated presentation template on the display based on the configuration parameters.

In one implementation, the set of metadata items comprises at least one of a title for respective videos in the first set of videos, a creator, a channel, one or more keywords, or statistics for respective videos in the first set of videos.

In one implementation, the apparatus includes means for determining an amount of time from a current point in time until a start of a next scheduled video in a pre-defined schedule of videos, receiving, from a recommendation server, time data for a plurality of recommended videos, determining a time length for respective videos in plurality of recommended videos, and selecting, based on the time length for respective videos in plurality of recommended videos and the amount of time from the current point in time until the start of a next scheduled video, one or more videos in the plurality of recommended videos.

In one implementation, the apparatus includes means for creating a filler playlist comprising the first set of videos.

The filler playlist is played from the current point in time until the start of the next scheduled video in the pre-defined schedule of videos. The apparatus includes means for playing the custom interstitial transition video in between playing of videos in the filler playlist.

What is claimed is:

1. A method comprising:
identifying, by a processing device, a base media item comprising a display area to be customized for a user of a client device to provide a transition between a first video to be played on the client device and a plurality of second videos playable on the client device after the first video, wherein at least one of the plurality of second videos is part of a playlist that does not include the first video;
causing, by the processing device, the first video to be played on a screen of the client device;
causing, by the processing device, the display area of the base media item to be automatically customized to transform the base media item into a custom transition media item that presents information about each of the plurality of second videos playable after the first video, wherein causing the display area of the base media item to be automatically customized comprises:
determining the plurality of second videos to be of interest to the user based at least in part on a viewing history of the user; and
causing the display area of the base media item to be populated with a plurality of metadata content items, wherein each of the plurality of metadata content items comprises information about a respective one of the plurality of second videos playable after the first video; and
causing, by the processing device, the base media item with the customized display area to be presented on the screen of the client device before playing any of the plurality of second videos to provide a transition from the first video, wherein the customized display area is overlaid with metadata content items of the plurality of metadata content items each comprising information about the respective one of the plurality of second videos, wherein a presentation of the base media item with the customized display area provides the user with at least two transition options comprising (i) waiting until the presentation of the base media item is transitioned, without any user interaction, to a start of a second video of the plurality of second videos while being presented with a changing indicator of time remaining to playback of the second video from the start, and (ii) selecting information about the second video from the playlist that does not include the first video to transition to the playback of the second video from the playlist that does not include the first video.

2. The method of claim 1 wherein the base media item is initially absent information about the plurality of second videos playable after the first video.

3. The method of claim 1 wherein causing the display area of the base media item to be populated with a plurality of metadata content items comprises:
populating an executable presentation template for the base media item with the plurality of metadata content items.

4. The method of claim 3 wherein causing the base media item with the customized display area to be presented on the screen of the client device comprises:
synchronizing execution of the populated executable presentation template with presentation of the base media item on the screen to overlay the customized display area of the base media item with the plurality of metadata content items, wherein the synchronizing creates a custom interstitial transition media item that informs the user about the plurality of second videos playable after the first video.

5. The method of claim 4, wherein the execution of the populated executable presentation template results in animation of the metadata content on the screen of the client device, and the display area of the base media item is overlaid with the animation of the plurality of metadata content items.

6. The method of claim 1, further comprising:
receiving configuration parameters for displaying the plurality of metadata content items in the display area of the base media item, the configuration parameters comprising at least one of a font style, a font size, a font color, a text position, or a type of animation; and
causing the plurality of metadata content items to be displayed in the display area of the base media item based on the configuration parameters.

7. The method of claim 1, wherein determining the plurality of second videos comprises:
determining an amount of time from a current point in time until a start of a next scheduled video in a pre-defined schedule of videos;
receiving, from a recommendation server, time data for a plurality of recommended videos;
determining a time length for respective videos in the plurality of recommended videos and for the base media item; and
selecting, based on the time length for respective videos in the plurality of recommended videos and the amount of time from the current point in time until the start of the next scheduled video, the plurality of second videos from the plurality of recommended videos, wherein the time length of the plurality of second videos is not greater than the amount of time from the current point in time to the start of the next scheduled video minus the time length of the base media item.

8. The method of claim 7, further comprising:
creating a filler playlist comprising the plurality of second videos, wherein the filler playlist is played from the current point in time until the start of the next scheduled video in the pre-defined schedule of videos; and
causing the custom transition media item to be presented in between playing of videos in the filler playlist.

9. The method of claim 7, wherein the first video is a scheduled video in the pre-defined schedule of videos.

10. A system for a client device of a user, the system comprising:
a memory, and
a processing device, coupled to the memory, to perform operations comprising:
identifying a base media item comprising a display area to be customized for a user of a client device to provide a transition between a first video to be played on the client device and a plurality of second videos playable on the client device after the first video, wherein at least one of the plurality of second videos is part of a playlist that does not include the first video;
causing the first video to be played on a screen of the client device;
causing the display area of the base media item to be automatically customized to transform the base media item into a custom transition media item that presents information about each of the plurality of second videos playable after the first video, wherein causing the display area of the base media item to be automatically customized comprises:
  determining the plurality of second videos to be of interest to the user based at least in part on a viewing history of the user; and
  causing the display area of the base media item to be populated with a plurality of metadata content items, wherein each of the plurality of metadata content items comprises information about a respective one of the plurality of second videos playable after the first video; and
  causing the base media item with the customized display area to be presented on the screen of the client device before playing any of the plurality of second videos, wherein the customized display area is overlaid with metadata content items of the plurality of metadata content items each comprising information about the respective one of the plurality of second videos, wherein a presentation of the base media item with the customized display area provides the user with at least two transition options comprising (i) waiting until the presentation of the base media item is transitioned, without any user interaction, to a start of a second video of the plurality of second videos while being presented with a changing indicator of time remaining to playback of the second video from the start, and (ii) selecting information about the second video from the playlist that does not include the first video to transition to the playback of the second video from the playlist that does not include the first video.

11. The system of claim 10 wherein the base media item is initially absent information about the plurality of second videos playable after the first video.

12. The system of claim 10 wherein causing the display area of the base media item to be populated with a plurality of metadata content items comprises:
  populating an executable presentation template for the base media item with the plurality of metadata content items.

13. The system of claim 12 wherein causing the base media item with the customized display area to be presented on the screen of the client device comprises:
  synchronizing execution of the populated executable presentation template with presentation of the base media item on the screen to overlay the customized display area of the base media item with the plurality of metadata content items, wherein the synchronizing creates a custom interstitial transition media item that informs the user about the plurality of second videos playable after the first video.

14. The system of claim 13, wherein the execution of the populated executable presentation template results in animation of the metadata content on the screen of the client device, and the display area of the base media item is overlaid with the animation of the plurality of metadata content items.

15. The system of claim 10, wherein determining the plurality of second videos comprises:
  determining an amount of time from a current point in time until a start of a next scheduled video in a pre-defined schedule of videos;
  receiving, from a recommendation server, time data for a plurality of recommended videos;
  determining a time length for respective videos in the plurality of recommended videos and for the base media item; and
  selecting, based on the time length for respective videos in the plurality of recommended videos and the amount of time from the current point in time until the start of the next scheduled video, the plurality of second videos from the plurality of recommended videos, wherein the time length of the plurality of second videos is not greater than the amount of time from the current point in time to the start of the next scheduled video minus the time length of the base media item.

16. The system of claim 15, wherein the operations further comprise:
  creating a filler playlist comprising the plurality of second videos, wherein the filler playlist is played from the current point in time until the start of the next scheduled video in the pre-defined schedule of videos; and
  causing the custom transition media item to be presented in between playing of videos in the filler playlist.

17. A non-transitory computer readable medium having instructions stored thereon that, when executed by a processing device of a client device of a user, cause the processing device to perform operations comprising:
  identifying a base media item comprising a display area to be customized for a user of a client device to provide a transition between a first video to be played on the client device and a plurality of second videos playable on the client device after the first video, wherein at least one of the plurality of second videos is part of a playlist that does not include the first video;
  causing the first video to be played on a screen of the client device;
  causing the display area of the base media item to be automatically customized to transform the base media item into a custom transition media item that presents information about each of the plurality of second videos playable after the first video, wherein causing the display area of the base media item to be automatically customized comprises:
    determining the plurality of second videos to be of interest to the user based at least in part on a viewing history of the user; and
    causing the display area of the base media item to be populated with a plurality of metadata content items, wherein each of the plurality of metadata content items comprises information about a respective one of the plurality of second videos playable after the first video; and
  causing the base media item with the customized display area to be presented on the screen of the client device before playing any of the plurality of second videos, wherein the customized display area is overlaid with metadata content items of the plurality of metadata content items each comprising information about the respective one of the plurality of second videos, wherein a presentation of the base media item with the customized display area provides the user with at least two transition options comprising (i) waiting until the presentation of the base media item is transitioned, without any user interaction, to a start of a second video of the plurality of second videos while being presented with a changing indicator of time remaining to playback of the second video from the start, and (ii) selecting information about the second video from the playlist that does not include the first video to transition to the playback of the second video from the playlist that does not include the first video.

18. The non-transitory computer readable medium of claim 17 wherein the base media item is initially absent information about the plurality of second videos playable after the first video.

19. The non-transitory computer readable medium of claim 17 wherein causing the display area of the base media item to be populated with a plurality of metadata content items comprises:
   populating an executable presentation template for the base media item with the plurality of metadata content items.

20. The non-transitory computer readable medium of claim 19 wherein causing the base media item with the customized display area to be presented on the screen of the client device comprises:
   synchronizing execution of the populated executable presentation template with presentation of the base media item on the screen to overlay the customized display area of the base media item with the plurality of metadata content items, wherein the synchronizing creates a custom interstitial transition media item that informs the user about the plurality of second videos playable after the first video.

* * * * *